US012771882B2

(12) United States Patent
Wu et al.

(10) Patent No.: US 12,771,882 B2
(45) Date of Patent: Oct. 20, 2026

(54) VIDEO PROCESSING

(71) Applicant: QUALCOMM Incorporated, San Diego, CA (US)

(72) Inventors: Junmin Wu, San Diego, CA (US); Khalid Tahboub, San Diego, CA (US); Scott Benjamin Leask, San Diego, CA (US); Jamie Menjay Lin, San Diego, CA (US); Hoang Cong Minh Le, Santee, CA (US); Kai Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 18/892,226

(22) Filed: Sep. 20, 2024

(65) Prior Publication Data

US 2026/0089353 A1 Mar. 26, 2026

(51) Int. Cl.
*H04N 19/85* (2014.01)
*H04N 19/42* (2014.01)

(52) U.S. Cl.
CPC ............. *H04N 19/85* (2014.11); *H04N 19/42* (2014.11)

(58) Field of Classification Search
CPC ............................... H04N 19/42; H04N 19/85
See application file for complete search history.

(56) References Cited

U.S. PATENT DOCUMENTS

2021/0211739 A1 7/2021 Andreopoulos et al.
2023/0154055 A1* 5/2023 Besenbruch ........... G06N 3/092 375/240.03
2024/0214578 A1 6/2024 Ryder et al.

FOREIGN PATENT DOCUMENTS

CN 110102051 A 8/2019

OTHER PUBLICATIONS

Chadha A., et al., "Deep Perceptual Preprocessing for Video Coding", 2021 IEEE/CVF Conference on Computer Vision and Pattern Recognition (CVPR), IEEE, Jun. 20, 2021, p. 14847-14856, XP034006916, sections 1, 3.1, 3.7, 4.1, figures 2a, 2b.
International Search Report and Written Opinion—PCT/US2025/046262—ISA/EPO—Jan. 28, 2026.

* cited by examiner

*Primary Examiner* — On S Mung
(74) *Attorney, Agent, or Firm* — Polsinelli LLP

(57) ABSTRACT

Systems and techniques are described herein for training a video preprocessor. For instance, a method for training a video preprocessor is provided. The method may include processing training video data using a video encoder-decoder to generate intermediate video data; processing the intermediate video data using the video preprocessor to generate output video data; determining a loss based on the output video data and the training video data; and adjusting parameters of the video preprocessor based on the loss, wherein the video preprocessor is configured to process video data to generate preprocessed video data and to provide the preprocessed video data to a video encoder.

20 Claims, 12 Drawing Sheets

VIDEO PROCESSING

TECHNICAL FIELD

The present disclosure generally relates to video processing. For example, aspects of the present disclosure relate to systems and techniques for improving video coding techniques (e.g., encoding and/or decoding video)

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Such devices allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Digital video devices can implement video coding techniques to compress video data. Video coding is performed according to one or more video coding standards or formats. For example, video coding standards or formats include versatile video coding (VVC), high-efficiency video coding (HEVC), advanced video coding (AVC), MPEG-2 Part 2 coding (MPEG stands for moving picture experts group), among others, as well as proprietary video codecs/formats such as AOMedia Video 1 (AV1) that was developed by the Alliance for Open Media. Video coding generally utilizes prediction methods (e.g., inter prediction, intra prediction, or the like) that take advantage of redundancy present in video images or sequences. A goal of video coding techniques is to compress video data into a form that uses a lower bit rate, while avoiding or minimizing degradations to video quality. With ever-evolving video services becoming available, coding techniques with better coding efficiency are needed.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Systems and techniques are described for training a video preprocessor. According to at least one example, a method is provided for training a video preprocessor. The method includes: processing training video data using a video encoder-decoder to generate intermediate video data; processing the intermediate video data using the video preprocessor to generate output video data; determining a loss based on the output video data and the training video data; and adjusting parameters of the video preprocessor based on the loss, wherein the video preprocessor is configured to process video data to generate preprocessed video data and to provide the preprocessed video data to a video encoder.

In another example, an apparatus for training a video preprocessor is provided that includes at least one memory and at least one processor (e.g., configured in circuitry) coupled to the at least one memory. The at least one processor configured to: process training video data using a video encoder-decoder to generate intermediate video data; process the intermediate video data using the video preprocessor to generate output video data; determine a loss based on the output video data and the training video data; and adjust parameters of the video preprocessor based on the loss, wherein the video preprocessor is configured to process video data to generate preprocessed video data and to provide the preprocessed video data to a video encoder.

In another example, a non-transitory computer-readable medium is provided that has stored thereon instructions that, when executed by one or more processors, cause the one or more processors to: process training video data using a video encoder-decoder to generate intermediate video data; process the intermediate video data using the video preprocessor to generate output video data; determine a loss based on the output video data and the training video data; and adjust parameters of the video preprocessor based on the loss, wherein the video preprocessor is configured to process video data to generate preprocessed video data and to provide the preprocessed video data to a video encoder.

In another example, an apparatus for training a video preprocessor is provided. The apparatus includes: means for processing training video data using a video encoder-decoder to generate intermediate video data; means for processing the intermediate video data using the video preprocessor to generate output video data; means for determining a loss based on the output video data and the training video data; and means for adjusting parameters of the video preprocessor based on the loss, wherein the video preprocessor is configured to process video data to generate preprocessed video data and to provide the preprocessed video data to a video encoder.

In another example, a method is provided for processing video data. The method includes: processing video data using a video preprocessor to generate preprocessed video data, wherein the video preprocessor is trained by processing training video data using a video encoder-decoder to generate intermediate video data, processing the intermediate video data using the video preprocessor to generate output video data, determining a loss based on the output video data and the training video data, and adjusting parameters of the video preprocessor based on the loss; and processing the preprocessed video data using a video encoder to generate encoded video data.

In another example, an apparatus for processing video data is provided that includes at least one memory and at least one processor (e.g., configured in circuitry) coupled to the at least one memory. The at least one processor configured to: process video data using a video preprocessor to generate preprocessed video data, wherein the video preprocessor is trained by processing training video data using a video encoder-decoder to generate intermediate video data, processing the intermediate video data using the video preprocessor to generate output video data, determining a loss based on the output video data and the training video data, and adjusting parameters of the video preprocessor based on the loss; and process the preprocessed video data using a video encoder to generate encoded video data.

In another example, a non-transitory computer-readable medium is provided that has stored thereon instructions that, when executed by one or more processors, cause the one or more processors to: process video data using a video preprocessor to generate preprocessed video data, wherein the video preprocessor is trained by processing training video data using a video encoder-decoder to generate intermediate video data, processing the intermediate video data using the video preprocessor to generate output video data, determining a loss based on the output video data and the training video data, and adjusting parameters of the video preprocessor based on the loss; and process the preprocessed video data using a video encoder to generate encoded video data.

In another example, an apparatus for processing video data is provided. The apparatus includes: means for processing video data using a video preprocessor to generate preprocessed video data, wherein the video preprocessor is trained by processing training video data using a video encoder-decoder to generate intermediate video data, processing the intermediate video data using the video preprocessor to generate output video data, determining a loss based on the output video data and the training video data, and adjusting parameters of the video preprocessor based on the loss; and means for processing the preprocessed video data using a video encoder to generate encoded video data.

In some aspects, one or more of the apparatuses described herein is, can be part of, or can include an extended reality device (e.g., a virtual reality (VR) device, an augmented reality (AR) device, or a mixed reality (MR) device), a vehicle (or a computing device, system, or component of a vehicle), a mobile device (e.g., a mobile telephone or so-called "smart phone", a tablet computer, or other type of mobile device), a smart or connected device (e.g., an Internet-of-Things (IoT) device), a wearable device, a personal computer, a laptop computer, a video server, a television (e.g., a network-connected television), a robotics device or system, or other device. In some aspects, each apparatus can include an image sensor (e.g., a camera) or multiple image sensors (e.g., multiple cameras) for capturing one or more images. In some aspects, each apparatus can include one or more displays for displaying one or more images, notifications, and/or other displayable data. In some aspects, each apparatus can include one or more speakers, one or more light-emitting devices, and/or one or more microphones. In some aspects, each apparatus can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
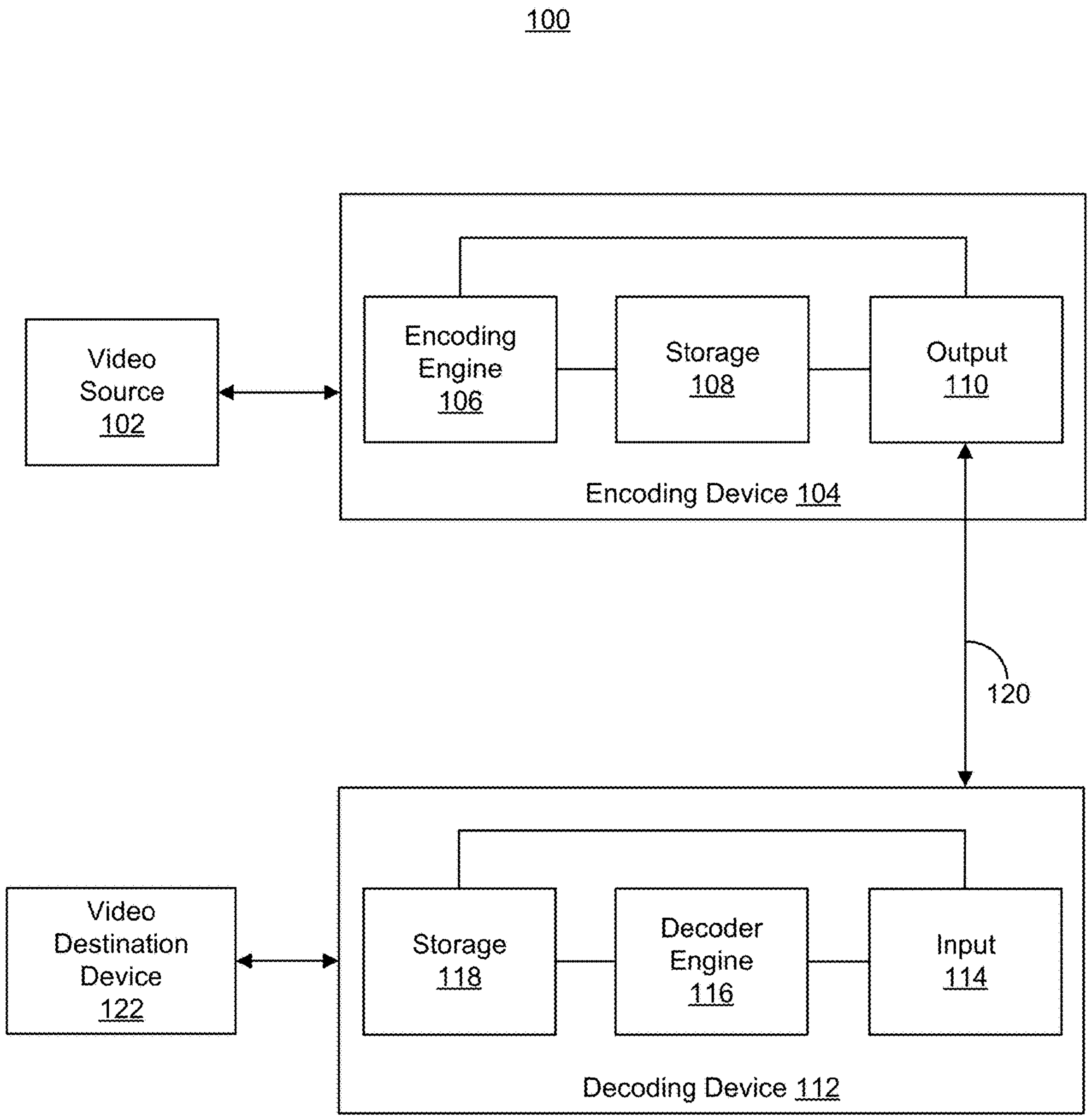
FIG. 1 is a block diagram illustrating an example of an encoding device and a decoding device, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data), and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the pixel values in the block being encoded and the predicted block. The prediction error can also be referred to as the residual. The video encoder may also apply a transform to the prediction error (e.g., a discrete cosine transform (DCT) or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy encode the quantized transform coefficients and/or the syntax elements, thereby further reducing the number of bits needed for their representation.

After entropy decoding and de-quantizing the received bitstream, a video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

As used herein, a "video codec" may be used to refer to software or hardware that compresses and/or decompresses digital video data. For example, a video codec can be used to compress raw video data to reduce file size for storage or transmission, and/or to decompress the video file for playback. Compressing video data may also referred to as "encoding" video data. Decompressing video data may also be referred to as "decoding" video data. A video codec IP core can be implemented as a dedicated hardware logic block that is designed for the efficient encoding and decoding (e.g., compression and decompression) of video streams or various other forms of video data. For example, a video codec IP core can be used to perform efficient encoding and decoding operations and can reduce the power consumption and silicon area needed on-device. The IP core of a video codec IP core can refer to a reusable unit of hardware logic (e.g., a hardware processing block, element, sub-system, etc.) that may be implemented in an integrated circuit, system-on-a-chip (SoC), or other circuitry within a computing device or other apparatus configured to perform video coding. For instance, video codec IP cores can be included in digital video processing systems, and can be integrated into various computing devices such as smartphones, televisions, cameras, etc.

Video coding can be performed according to a particular video coding standard. Examples of video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual, Advanced Video Coding (AVC) or ITU-T H.264, including its Scalable Video Coding (SVC) and Multiview Video Coding (MVC) extensions, High Efficiency Video Coding (HEVC) or ITU-T H.265, including its range and screen content coding, 3D video coding (3D-HEVC), multiview (MV-HEVC), and scalable (SHVC) extensions, Versatile Video Coding (VVC) or ITU-T H.266 and its extensions, VP9, Alliance of Open Media (AOMedia) Video 1 (AV1), Essential Video Coding (EVC), among others. Newer generations of video codecs may provide greater compression efficiency, improved video quality, and/or support for higher resolutions and frame rates, etc. For example, more recent video codecs such as HEVC, VP9, VVC, and AV1 can implement more efficient compression that may be used to support applications such as 4K and 8K streaming, etc.

A video preprocessor may improve the ability of a video encoder to encode video data. For example, a video preprocessor may remove noise in video data, improve quality of the video data, and/or otherwise modify the video data such that an encoder can encode video data in such a way that the video data, after being decoded by a video decoder, is more similar to the original video data.

It is desirable to train a machine-learning model to preprocess video data (e.g., to train a video preprocessor). A machine-learning model trained as a video preprocessor may perform better than other video preprocessors which may include, for example, handcrafted filters, bilateral filters, and/or guided filters. For example, a video preprocessor may be trained to make input video easier to compress and save bit rate while maintaining the same quality at the output of the decoder.

A challenge in training a video preprocessor is that standard backpropagation training techniques cannot train non-continuous and/or non-differentiable operations. If any module of a network is non-continuous or non-differentiable, traditional backward-based end-to-end neural network training techniques cannot be used. Many video codecs (e.g., h.264) are non-continuous and non-differentiable.

Systems, apparatuses, methods (also referred to as processes), and computer-readable media (collectively referred to herein as "systems and techniques") are described herein for training a video preprocessor. For example, the systems and techniques described herein may train a video preprocessor. Additionally or alternatively, the systems and techniques may use a video preprocessor trained as described herein.

The systems and techniques may train a video preprocessor using one or more of the following phases: 1) as a postprocessor, 2) through feed-forward optimization, and 3) through domain adaptation. For example, the systems and techniques may involve initializing the video preprocessor then training the video preprocessor as if the video preprocessor were a video postprocessor, for example, according to a backpropagation training process. Additionally or alternatively, the systems and techniques finetune the video preprocessor using a feed-forward optimization technique. Additionally or alternatively, the systems and techniques may finetune the video preprocessor online, for example as the video preprocessor is in a deployed in a device or system. Training the video preprocessor online may be referred to as domain adaptation.

Various aspects of the application will be described with respect to the figures below.

The systems and techniques described herein can be applied to any of the existing video codecs (e.g., VVC, HEVC, AVC, or other suitable existing video codec), and/or can be an efficient coding tool for any video coding standards being developed and/or future video coding standards. For example, examples described herein can be performed using video codecs such as VVC, HEVC, AVC, and/or extensions thereof. However, the techniques and systems described herein may also be applicable to other coding standards, codecs, or formats, such as MPEG, JPEG (or other coding standard for still images), VP9, AV1, extensions thereof, or other suitable coding standards already available or not yet available or developed. For instance, in some examples, the encoding device 104 and/or the decoding device 112 may operate according to a proprietary video codec/format, such as AV1, extensions of AV1, and/or successor versions of AV1 (e.g., AV2), or other proprietary formats or industry standards. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted SL, SCb, and SCr. SL is a two-dimensional array of luma samples, SCb is a two-dimensional array of Cb chrominance samples, and SCr is a two-dimensional array of Cr chrominance samples. Chrominance samples may also be referred to herein as "chroma" samples. A pixel can refer to all three components (luma and chroma samples) for a given location in an array of a picture. In other instances, a picture may be monochrome and may only include an array of luma samples, in which case the terms pixel and sample can be used interchangeably. With respect to example techniques described herein that refer to individual samples for illustrative purposes, the same techniques can be applied to pixels (e.g., all three sample components for a given location in an array of a picture). With respect to example techniques described herein that refer to pixels (e.g., all three sample components for a given location in an array of a picture) for illustrative purposes, the same techniques can be applied to individual samples.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random-access point picture in the base layer and with certain properties up to and not including a next AU that has a random-access point picture in the base layer and with certain properties. For example, the certain properties of a random-access point picture that starts a CVS may include a RASL flag (e.g., NoRaslOutputFlag) equal to 1. Otherwise, a random-access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). In some cases, each slice or other portion of a bitstream can reference a single active PPS, SPS, and/or VPS to allow the decoding device 112 to access information that may be used for decoding the slice or other portion of the bitstream.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are then partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some examples, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may be quantized by the encoder engine 106.

Once the pictures of the video data are partitioned into CUs, the encoder engine 106 predicts each PU using a prediction mode. The prediction unit or prediction block is subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and the decoder engine 116 (described in more detail below) may be configured to operate according to VVC. According to VVC, a video coder (such as the encoder engine 106 and/or the decoder engine 116) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

When operating according to the AV1 codec, encoder engine 104 and decoder engine 112 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Encoder engine 104 may further partition a superblock into smaller coding blocks. Encoder engine 104 may partition a superblock and other coding blocks into smaller blocks using square or non-square partitioning. Non-square blocks may include N/2×N, N×N/2, N/4×N, and N×N/4 blocks. Encoder engine 104 and decoder engine 112 may perform separate prediction and transform processes on each of the coding blocks.

AV1 also defines a tile of video data. A tile is a rectangular array of superblocks that may be coded independently of other tiles. That is, encoder engine 104 and decoder engine 112 may encode and decode, respectively, coding blocks within a tile without using video data from other tiles. However, encoder engine 104 and decoder engine 112 may perform filtering across tile boundaries. Tiles may be uniform or non-uniform in size. Tile-based coding may enable parallel processing and/or multi-threading for encoder and decoder implementations.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning per HEVC, QTBT partitioning, MTT partitioning, or other partitioning structures.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction utilizes the correlation between spatially neighboring samples within a picture. There is a plurality of intra-prediction modes (also referred to as "intra modes"). In some examples, the intra prediction of a luma block includes 35 modes, including the Planar mode, DC mode, and 33 angular modes (e.g., diagonal intra-prediction modes and angular modes adjacent to the diagonal intra-prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

Specification of intra-prediction mode and associated names

| Intra-prediction mode | Associated name |
|---|---|
| 0 | INTRA_PLANAR |
| 1 | INTRA_DC |
| 2 . . . 34 | INTRA_ANGULAR2 . . . INTRA_ANGULAR34 |

Inter-picture prediction uses the temporal correlation between pictures in order to derive a motion-compensated prediction for a current block of image samples. Using a translational motion model, the position of a block in a previously decoded picture (a reference picture) is indicated by a motion vector (Δx, Δy), with Δx specifying the horizontal displacement and Δy specifying the vertical displacement of the reference block relative to the position of the current block. In some cases, a motion vector (Δx, Δy) can be in integer sample accuracy (also referred to as integer accuracy), in which case the motion vector points to the integer-pel grid (or integer-pixel sampling grid) of the reference frame. In some cases, a motion vector (Δx, Δy) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction (also referred to as bi-directional inter-prediction), two sets of motion parameters ($\Delta x_0$, $y_0$, refIdx, and $\Delta x_1$, $y_1$, $refIdx_1$) are used to generate two motion compensated predictions (from the same reference picture or possibly from different reference pictures). For example, with bi-prediction, each prediction block uses two motion compensated prediction signals, and generates B prediction units. The two motion compensated predictions are combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoding device 104 using a motion estimation process.

With inter-prediction using uni-prediction (also referred to as uni-directional inter-prediction), one set of motion parameters ($\Delta x_0$, $y_0$, $refIdx_0$) is used to generate a motion compensated prediction from a reference picture. For example, with uni-prediction, each prediction block uses at most one motion compensated prediction signal and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector (Δx), a vertical component of the motion vector (Δy), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, encoding device 104 and decoding device 112 do not use video data from other frames of video data. For most intra prediction modes, the video encoding device 104 encodes blocks of a current frame based on the difference between sample values in the current block and predicted values generated from reference samples in the same frame. The video encoding device 104 determines predicted values generated from the reference samples based on the intra prediction mode.

After performing prediction using intra- and/or inter-prediction, the encoding device 104 can perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some examples, a TU may be used for the transform and quantization processes implemented by the encoder engine 106. A given CU having one or more PUs may also include one or more TUs. As described in further detail below, the residual values may be transformed into transform coefficients using the block transforms and may be quantized and scanned using TUs to produce serialized transform coefficients for entropy coding.

In some examples, following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. The encoder engine 106 may form the TUs including the residual data for the CU, and may transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may be entropy encoded by the encoder engine 106. In some examples, the encoder engine 106 may utilize a predefined scan order to scan the quantized transform coefficients to produce a serialized vector that can be entropy encoded. In some examples, the encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communication link 120 to the decoding device 112 of the receiving device. The input 114 of the decoding device 112 may receive the NAL units. The communication link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi, radio frequency (RF), UWB, WiFi-Direct, cellular, Long-Term Evolution (LTE), WiMax, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in a storage 108. The output 110 may retrieve the encoded video bitstream data from the encoder engine 106 or from the storage 108. The storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection, and may include a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to the storage 118 for later use by the decoder engine 116. For example, the storage 118 can include a DPB for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitted the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may rescale and perform an inverse transform on the encoded video bitstream data. Residual data is passed to a prediction stage of the decoder engine 116. The decoder engine 116 predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some examples, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device.

An example of specific details of the encoding device 104 is described below with reference to FIG. 2. An example of specific details of the decoding device 112 is described below with reference to FIG. 3.

The example system shown in FIG. 1 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers usually represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. In some examples, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some examples, the VPS, SPS, or PPS may be transmitted in-band with the encoded bitstream. In some examples, the VPS, SPS, or PPS may be transmitted out-of-band in a separate transmission than the NAL units containing coded video data.

This disclosure may generally refer to "signaling" certain information, such as syntax elements. The term "signaling" may generally refer to the communication of values for syntax elements and/or other data used to decode encoded video data. For example, the video encoding device 104 may signal values for syntax elements in the bitstream. In general, signaling refers to generating a value in the bitstream. As noted above, video source 102 may transport the bitstream to video destination device 122 substantially in real time, or not in real time, such as might occur when storing syntax elements to storage 108 for later retrieval by the video destination device 122.

Figure 2:
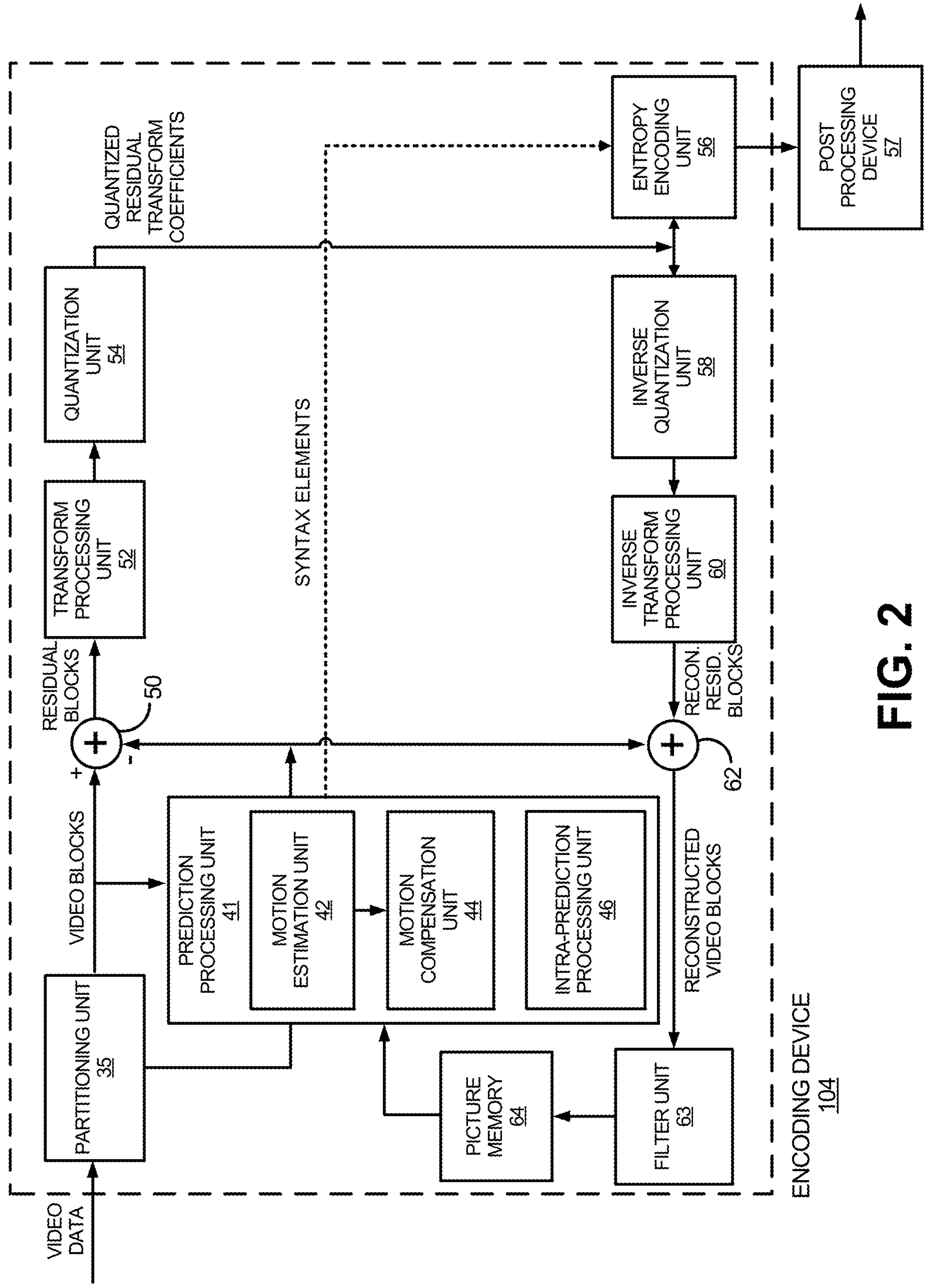
FIG. 2 is a block diagram illustrating an example video encoding device, in accordance with some examples.
Figure 3:
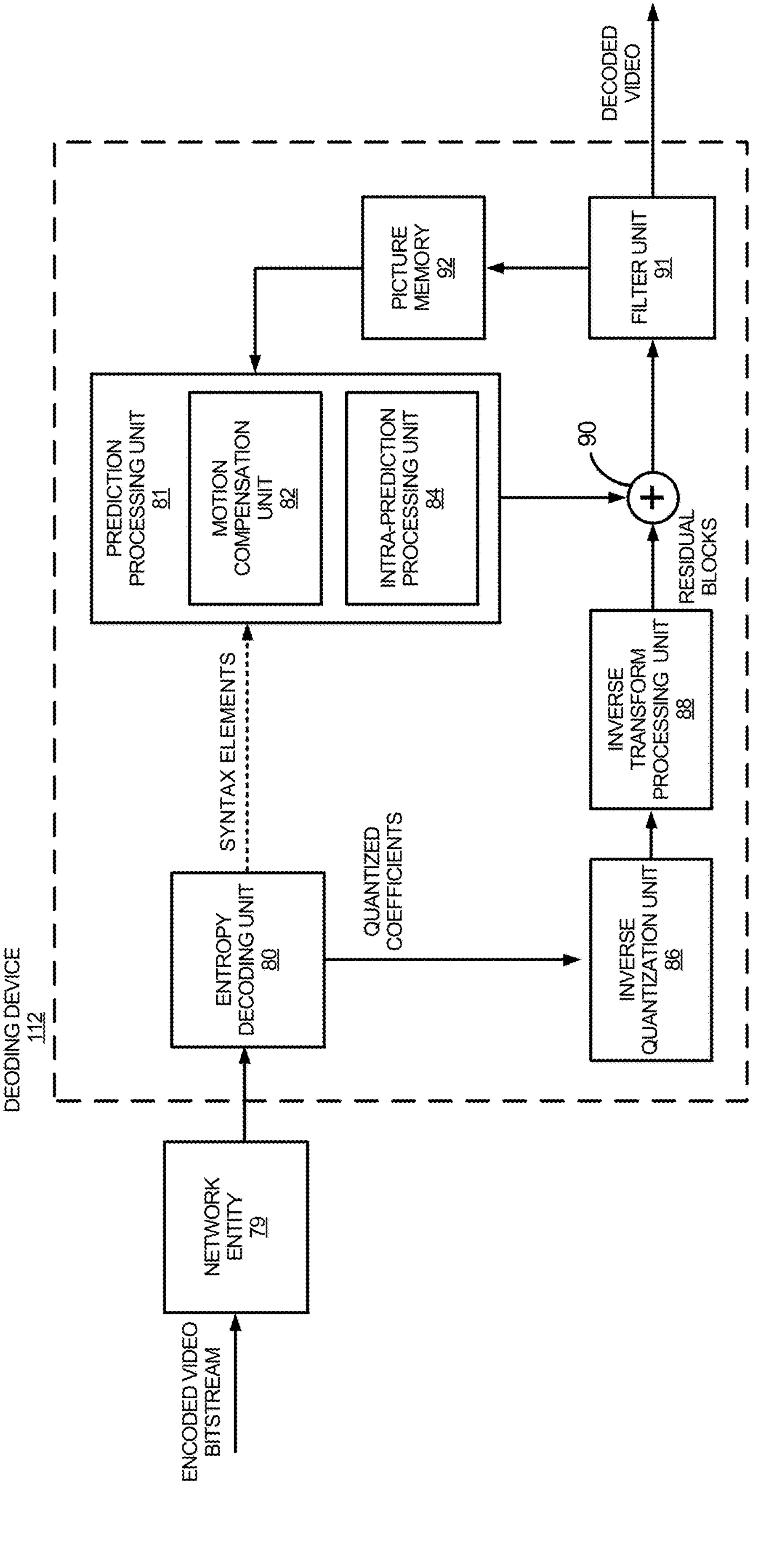
FIG. 3 is a block diagram illustrating an example video decoding device, in accordance with some examples.

Specific details of the encoding device 104 and the decoding device 112 are shown in FIG. 2 and FIG. 3, respectively. FIG. 2 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relics, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 3 as being an in-loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 2, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs (e.g., CTUs) and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 may select an appropriate intra-prediction mode to use from the tested modes. For example, intra-prediction processing unit 46 may calculate rate-distortion values using a rate-distortion analysis for the various tested intra-prediction modes and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 2 represents an example of a video encoder configured to perform the techniques described herein. For instance, the encoding device 104 may perform any of the techniques described herein, including the processes described herein. In some cases, some of the techniques of this disclosure may also be implemented by post processing device 57.

FIG. 3 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 2.

During the decoding process, the decoding device 112 receives an encoded video bitstream that represents video blocks of an encoded video slice and associated syntax elements sent by the encoding device 104. In some examples, the decoding device 112 may receive the encoded video bitstream from the encoding device 104. In some examples, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (e.g., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements and may use the interpolation filters to produce predictive blocks.

Inverse quantization unit 86 inverse quantizes, or dequantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 3 as being an in-loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In this manner, the decoding device 112 of FIG. 3 represents an example of a video decoder configured to perform the techniques described herein. For instance, the decoding device 112 may perform any of the techniques described herein, including the processes described herein.

Figure 4:
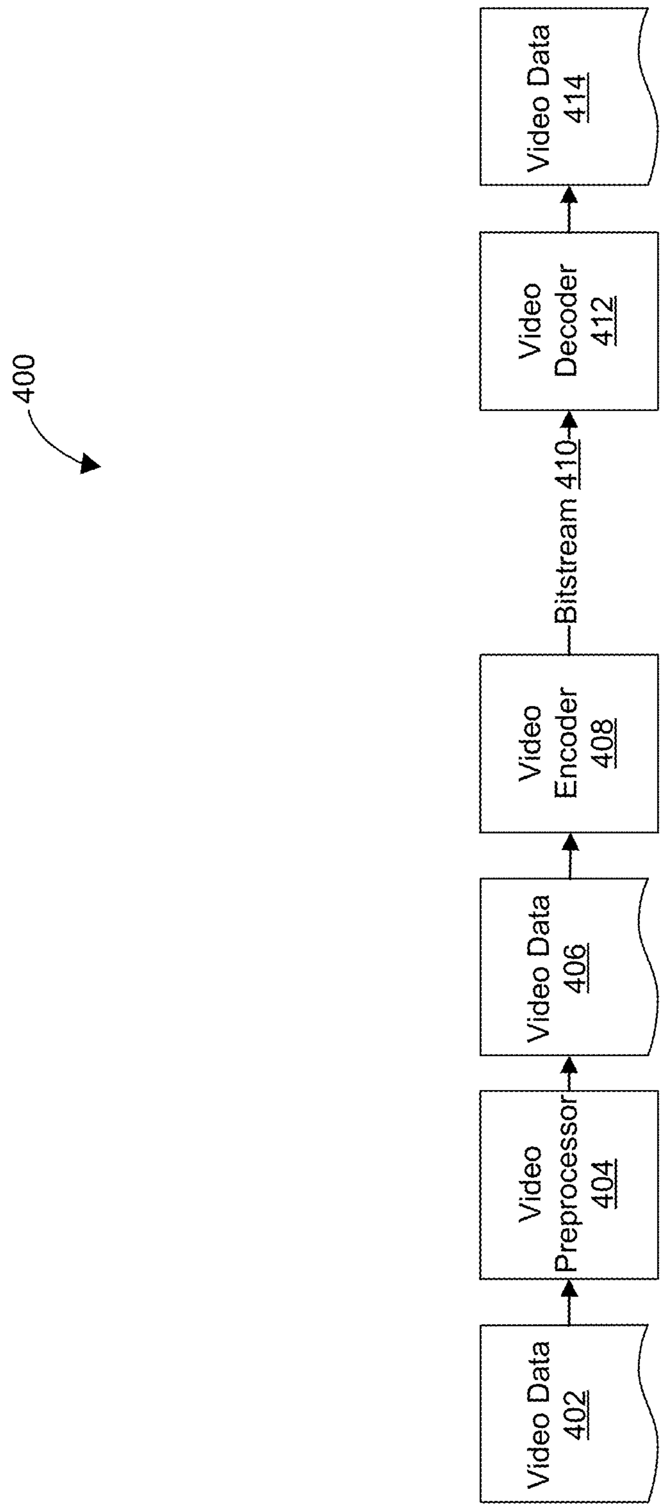
FIG. 4 is a block diagram illustrating an example system for processing video data, according to various aspects of the present disclosure.

FIG. 4 is a block diagram illustrating an example system 400 for processing video data, according to various aspects of the present disclosure. In general, a video preprocessor 404 may process video data 402 to generate video data 406, a video encoder 408 may process video data 406 to generate bitstream 410, and a video decoder 412 may process bitstream 410 to generate video data 414.

Video data 402 may be, or may include, video data according to any suitable format. Video data 402 may include a series of images and/or audio data. Video data 402 may be raw data, for example, captured by a camera and/or microphone of a device, such as a smartphone, an extended reality (XR) device, a vehicle, etc. Additionally or alternatively, video data 402 may be processed, generated, rendered, stored, transmitted, and/or received video data.

Video preprocessor 404 may be a preprocessor trained according to various aspects of the present disclosure. In general, a machine-learning model may be trained (e.g., through an iterative training process). Once trained, the machine-learning model may be used to generate results based on new data (e.g, data that was not used to train the machine-learning model). Using a trained model to generate results based on new data may be referred to as "inference." Thus a machine-learning model may operate during a "training phase" in which parameters of the machine-learning model are adjusted based on the training. After the training phase, the machine-learning model may be deployed in a system or device and may operate during an "inference phase" in which the system or device may provide the machine-learning model with new data and the machine-learning model may generate results based on the new data.

Video preprocessor 404 may, at inference, process video data 402 to generate video data 406. For example, video preprocessor 404 may be trained according to the various aspects of the present disclosure. Once trained, video preprocessor 404 may be deployed in system 400 and may perform inference on video data 402. In other words, once trained, video preprocessor 404 may operate to process video data 402 (which may be new data that is used in the training of video preprocessor 404) to generate video data 406.

In some aspects, video preprocessor 404 may be trained in a system or device that is different from system 400. For example, in some aspects, video preprocessor 404 may be trained using a video encoder and/or video decoder that is different from video encoder 408 and video decoder 412 of system 400. In other aspects, video preprocessor 404 may be trained with video encoder 408 and/or video decoder 412 and be deployed in system 400 with video encoder 408 and/or video decoder 412.

Video preprocessor 404 may be referred to as a "preprocessor" because video preprocessor 404 may process video data 402 preliminary to video encoder 408 encoding video data 406 to generate bitstream 410. Video data 406 may be referred to as "preprocessed video data" based on video data 406 having been processed by video preprocessor 404. Video preprocessor 404 may alter video data 402 in such a way that video data 406 can be encoded, then decoded, such that the decoded video data is similar to video data 402 and a bit rate of the encoded video data is better the bit rate of video data 402. Video preprocessor 404 may be, or may include, a machine-learning model according to any suitable architecture, including, as examples, a U-net, a convolutional neural network (CNN), a generative adversarial network (GAN), etc.

Video encoder 408 may be, or may include, a video encoder that may apply any suitable technique for encoding video data. Video encoder 408 may process (e.g., compress) video data 406 to generate bitstream 410.

Bitstream 410 may be a compressed representation of video data 406. Bitstream 410 may have a bit rate. The bit rate of bitstream 410 may be a measure of a number of bits per second of bitstream 410. For example, video data 402 may include 30 frames per second (fps). Each of the frames may be 1 megabyte (MB) in size. Accordingly, video data 402 may have a bit rate of 30 megabytes per second (MBps). Bitstream 410, being a compressed representation of video data 402, may have a bit rate of, for example, 5 MBps. A comparison of the bit rate of video data 402 and the bit rate of bitstream 410 may be a measure of the compression efficiency of video preprocessor 404 and/or video encoder 408.

Video decoder 412 may be, or may include, a video decoder that may apply any suitable technique for decoding video data. Video decoder 412 may process (e.g., decompress) bitstream 410 to generate video data 414.

Video decoder 412 may be separate from video encoder 408 by time, location, and/or as parts of separate devices or systems. For example, video encoder 408 may be part of a first device at a first location. The first device may obtain video data 402, preprocess video data 402 at video preprocessor 404 to generate video data 406, then encode video encoder 408 at video encoder 408 as bitstream 410. The first device may send bitstream 410 (e.g., via a communication network) or store bitstream 410 (e.g., in the cloud). A second device at a second location may obtain (e.g., receive or download) bitstream 410. The second device may include video decoder 412. Video decoder 412 decode bitstream 410 to generate video data 414, for example, for displaying video data 414 at the second device.

As another example, bitstream 410 may be stored for decoding and viewing at a later time. For example, a first device may obtain video data 402, preprocess video data 402 at video preprocessor 404 to generate video data 406, then encode video encoder 408 at video encoder 408 as bitstream 410. The first device may store bitstream 410 at the first device (or a network storage accessible to system 400). At a later time, video decoder 412 of the first device may decode the stored bitstream 410 at video decoder 412 to generate video data 414, for example, to display video data 414 at the first device.

Video preprocessor 404 may be trained through to one of more of the following phases of training: 1) as a postprocessor, 2) through feed-forward optimization, and 3) through domain adaptation. Additional description regarding training video preprocessor 404 as a postprocessor is provided with regard to FIG. 5. Additional description regarding training video preprocessor 404 through feed-forward optimization is provided with regard to FIG. 6. Additional description regarding training video preprocessor 404 through domain adaptation is provided with regard to FIG. 7. Although the three phases are described in an order, the three phases may be implemented in another order. Additionally, although all three phases are described, in some aspects, video preprocessor 404 may be trained according to any one or any combination of the three phases.

Figure 5:
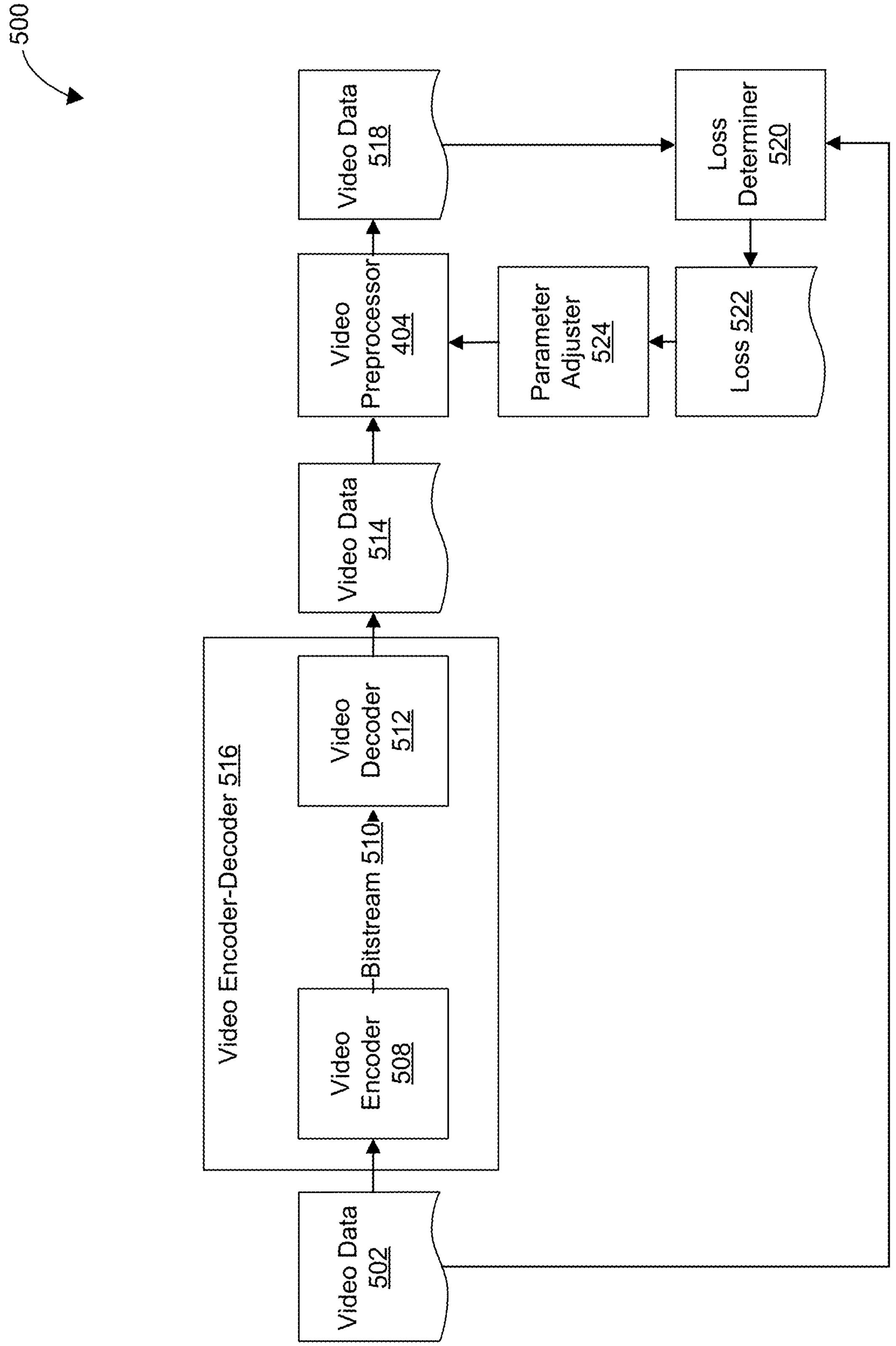
FIG. 5 is a block diagram illustrating an example system for training a video preprocessor, according to various aspects of the present disclosure.

FIG. 5 is a block diagram illustrating an example system 500 for training video preprocessor 404, according to various aspects of the present disclosure. System 500 implements an example of training video preprocessor 404 through an "as a postprocessor" phase of training. Video preprocessor 404 may be trained according to one or more additional phases of training in addition to the "as a processor" phase of training described with regard to FIG. 5.

In general, a video encoder 508 may process video data 502 to generate bitstream 510, a video decoder 512 may process bitstream 510 to generate video data 514, video preprocessor 404 may process video data 514 to generate video data 518. A loss determiner 520 may determine loss 522 by comparing video data 502 to video data 518. For example, loss determiner 520 may determine a mean square error (MSE) difference between video data 502 and video data 518, a structural similarity index measure (SSIM) between video data 502 and video data 518, and/or a visual information fidelity (VIF) comparison based on video data 502 and video data 518. A parameter adjuster 524 may adjust one or more parameters (e.g., weights and/or biases of a neural network, support vectors of a support vector machine, and/or coefficients in a linear regression and/or logistic regression) of video preprocessor 404 based on loss 522.

Video encoder 508 may be the same as, may be substantially similar to, and/or may perform the same, or substantially the same, operations as video encoder 408 of FIG. 4. Bitstream 510 may be the same as, or may be substantially similar to, bitstream 410 of FIG. 4. Video decoder 512 may be the same as, may be substantially similar to, and/or may perform the same, or substantially the same, operations as video decoder 412 of FIG. 4. Video data 514 may be the same as, or may be substantially similar to, video data 414 of FIG. 4.

Additionally, video encoder 508 may be part of a video encoder-decoder 516. Video encoder-decoder 516 may include video encoder 508 and video decoder 512, for example, in the same system or device. Video encoder-decoder 516 may include a direct connection between video encoder 508 and video decoder 512, for example, not separating video encoder 408 and video decoder 412 as described with regard to FIG. 4.

According to various aspects of the present disclosure, video preprocessor 404 may be configured as a preprocessor to preprocess video data. For example, video preprocessor 404 may be used to process video data prior to the video data being encoded by an encoder. For example, video preprocessor 404 may be trained (e.g., through the "as a postprocessor" stage described with regard to FIG. 5 and/or through other training stages or processes) to process video data 402 to generate video data 406 to be encoded by video encoder 408.

However, in the "as a postprocessor" training described with regard to FIG. 5, video preprocessor 404 may be trained (e.g., through an end-to-end backpropagation training process) as if video preprocessor 404 were a video postprocessor. For example, video preprocessor 404 may be included in system 500 in the position that would typically be occupied by a postprocessor (e.g., a processor configured to process video data 514 output by video decoder 512). Video preprocessor 404, in the position typically occupied by a postprocessor, may be trained through an end-to-end backpropagation process.

In some aspects, prior to the "as a postprocessor" phase described with regard to FIG. 5, video preprocessor 404 may be initialized with random parameters (e.g., generated by a random-number generator, selected as part of a random parameter set, or a random selection of previously-used parameters). For example, the "as a processor" phase described with regard to FIG. 5 may be a first phase of training video preprocessor 404. For instance, prior to the "as a processor" phase described with regard to FIG. 5, video preprocessor 404 may receive little or no training or configuration.

Video data 502 may be an instance of video data of a corpus of training data. For example, video data 502 may be training video data (e.g., video data that may be used to train a machine-learning model). According to the "as a processor" phase described with regard to FIG. 5, video encoder 508 may encode video data 502 as bitstream 510. Further, video decoder 512 may decode bitstream 510 to generate video data 514. Video preprocessor 404 may process video data 514 to generate video data 518.

Video data 502 may be used as an input in the supervised-learning process of training video preprocessor 404. Video data 514 may be referred to as "intermediate" video data because video data 514 may be generated in the process of processing video data 502 to generate video data 518. Video data 502 may be used as input data in the supervised-learning process of training video preprocessor 404 and video data 518 may be used as output video data in the supervised-learning process of training video preprocessor 404. For example, video data 518 may be compared with ground-truth video data to determine how well video preprocessor 404 is performing. Video data 514 may be generated at an intermediate step in the process of processing video data 502 to generate video data 518

Loss determiner 520 may generate loss 522 based on video data 518 and video data 502. For example, loss determiner 520 may compare video data 518 and video data 502 and determine loss 522 based on differences between video data 518 and video data 502.

Video encoder 508 may seek to compress video data 502 to bitstream 510 such that bitstream 510 has a smaller bit rate than video data 502. Yet, video encoder 508 may seek to compress video encoder 508 such that when video decoder 512 decompresses bitstream 510 to generate video data 514, video data 514 is similar to video data 502. Further, video preprocessor 404 may seek to process video data 514 to generate video data 518 such that video data 518 is similar to video data 502. Thus, differences between video data 502 and video data 518 may be indicative of improvements that could be made to video encoder 508, video decoder 512 and/or video preprocessor 404. Because video encoder 508 and video decoder 512 may be static (e.g., frozen) in system 500, differences between video data 502 and video data 518 are used by system 500 as indications of improvements that could be made to video preprocessor 404.

Loss determiner 520 may determine loss 522 as a distortion loss between video data 502 and video data 518. Distortion may refer to alteration and/or deformation that may affect the size and/or patterns of the objects in images. Distortion loss may be a measure of distortion between to images. Higher distortion loss may reflect more distortion between two images and lower distortion loss may reflect less distortion between two images. For example, loss determiner 520 may determine loss 522 based on a mean square error (MSE) difference between video data 502 and video data 518, a structural similarity index measure (SSIM)

between video data 502 and video data 518, and/or a visual information fidelity (VIF) comparison based on video data 502 and video data 518.

In some aspects, to improve the training of video preprocessor 404, parameters of video encoder 508 may be adjusted. For example, a peak signal-to-noise ratio (PSNR) of video encoder 508 may be adjusted to improve the training of video preprocessor 404 for instance by increasing differences between video data 514 and video data 502 based on the increased PSNR of video encoder 508.

Parameter adjuster 524 may adjust parameters (e.g., weights) of video preprocessor 404, for example, according to a gradient descent technique, such that in further iterations of the training process described with regard to FIG. 5, video data 518 is more similar to video data 502.

The process described with regard to FIG. 5 may be repeated any number of times. For example, the process may be repeated until loss 522 is below a loss threshold (e.g., for a threshold number of iterations) or until changes to parameters are below a weight-change threshold (e.g., for a threshold number of iterations). In other words, the training process of FIG. 5 may be repeated until video preprocessor 404 converges.

Figure 6:
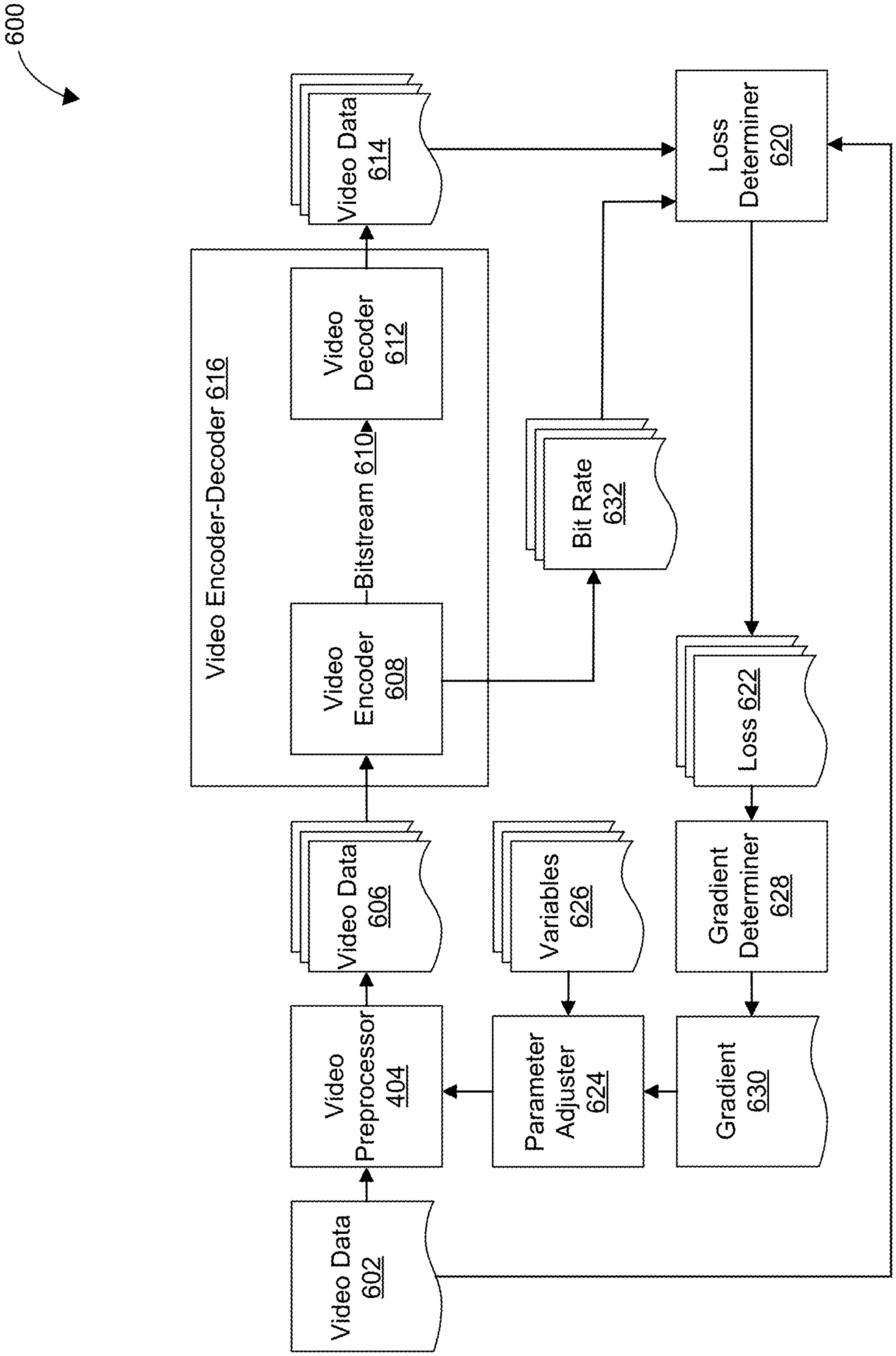
FIG. 6 is a block diagram illustrating an example system 600 for training a video preprocessor, according to various aspects of the present disclosure.

FIG. 6 is a block diagram illustrating an example system 600 for training video preprocessor 404, according to various aspects of the present disclosure. System 600 implements an example of training video preprocessor 404 through an "feed-forward optimization" phase of training. Video preprocessor 404 may be trained according to one or more additional phases of training in addition to the "feed-forward optimization" phase of training described with regard to FIG. 6. For example, prior to the "feed-forward optimization" phase of training described with regard to FIG. 6, video preprocessor 404 may be trained according to the "as a postprocessor" phase of training described with regard to FIG. 5.

In general, a parameter adjuster 624 may adjust parameters (e.g., weights) of video preprocessor 404 by a known amount, then video preprocessor 404, may process video data 602 a first time to generate a first instance of video data 606. A video encoders 608 may process the first instance of video data 606 to generate a first instance of bitstream 610 and a video decoder 612 may process the first instance of bitstream 610 to generate a first instance of video data 614. A loss determiner 620 may determine a first instance of a loss 622 based on video data 602 and the first instance of video data 614.

Then parameter adjuster 624 may adjust the parameters of video preprocessor 404 by another known amount (e.g., opposite the first amount), then video preprocessor 404, may process video data 602 a second time to generate a second instance of video data 606. Video encoder 608 may process the second instance of video data 606 to generate a second instance of bitstream 610 and video decoder 612 may process the second instance of bitstream 610 to generate a second instance of video data 614. Loss determiner 620 may determine a second instance of loss 622 based on video data 602 and the second instance of video data 614. After determining the first instance of loss 622 and second instance of loss 622, gradient determiners 628 may determine a gradient 630 based on the first instance of loss 622 and the second instance of loss 622. Parameter adjuster 624 may adjust parameters of video preprocessor 404 based on gradient 630.

Video encoder 608 may be the same as, may be substantially similar to, and/or may perform the same, or substantially the same, operations as video encoder 408 of FIG. 4. Bitstream 610 may be the same as, or may be substantially similar to, bitstream 410 of FIG. 4. Video decoder 612 may be the same as, may be substantially similar to, and/or may perform the same, or substantially the same, operations as video decoder 412 of FIG. 4. Video encoder-decoder 616 may be the same as, may be substantially similar to, and/or may perform the same, or substantially the same, operations as video encoder-decoder 516 of FIG. 5. Video data 614 may be the same as, or may be substantially similar to, video data 414 of FIG. 4. Loss determiner 620 may be the same as, may be substantially similar to, and/or may perform the same, or substantially the same, operations as loss determiner 520 of FIG. 5. Loss 622 may be the same as, or may be substantially similar to, loss 522 of FIG. 5.

In a first step of the "feed-forward optimization" phase of FIG. 6 a parameter adjuster 624 may adjust one or more (e.g., all) parameters (e.g., weights) of video preprocessor 404 based on a first set of variables 626. Variables 626 may be a set of random variables, for example a random gaussian noise with zero mean and a standard variance. Variables 626 may include one value for each parameter of video preprocessor 404. A variance of the variables may be a hyperparameter of the "feed-forward optimization" phase of FIG. 6.

Video preprocessor 404 (with the adjusted parameters) may process video data 602 (e.g., training video data) to generate a first instance of video data 606. Video encoder 608 may generate a first instance of bitstream 610 based on video encoder 608. Video decoder 612 may process the first instance of bitstream 610 to generate first instance of video data 614. Loss determiner 620 may determine a first instance of loss 622 based on video data 602 and the first instance of video data 614. For example, loss determiner 620 may determine the first instance of loss 622 based on a distortion loss between video data 602 and the first instance of video data 614. Additionally, loss determiner 620 may determine the first instance of loss 622 based on a bit rate 632 of the first instance of bitstream 610. For example, loss determiner 620 may determine the first instance of loss 622 as $$l_{+=rate1+\lambda} * MSE(\text{input video, reconstructed video } 1)$$

where $l_+$ represents the first instance of loss 622,
where rate1 represents bit rate 632 of the first instance of bitstream 610,
where $\lambda$ is a hyperparameter,
where MSE represents a mean-square error function as an example of a distortion-loss determining function,
where input video represents video data 602, and
where reconstructed video 1 represents the first instance of video data 614.

In a second step of the "feed-forward optimization" phase of FIG. 6 parameter adjuster 624 may adjust one or more parameters of video preprocessor 404 based on a second set of variables 626. The second set of variables 626 may be related to the first set of variables 626. For example, the second set of variables 626 may be the first set of variables 626 multiplied by −2. For example, in the first step, parameter adjuster 624 may adjust video preprocessor 404 by a first amount, in a first "direction," based on the first set of variables 626. In the second step, parameter adjuster 624 may adjust video preprocessor 404 by twice the first amount, and in the opposite "direction" based on the second set of variables 626. For instance, a given weight of video preprocessor 404, prior to the first step, may be 0. In the first step, a variable corresponding to the given weight may be 1.

In the first step, parameter adjuster 624 may adjust the given weight by adding the variable to the given weight such that the first weight becomes 1. In the second step, a variable corresponding to the given weight may be −2 (e.g., −2*the first weight). In the second step, parameter adjuster 624 may add the second variable (−2) to the given weight such that the given weight becomes −1.

Video preprocessor 404 (with the adjusted parameters) may process video data 602 (e.g., the same training video data processed in the first step) to generate a second instance of video data 606. Video encoder 608 may generate a second instance of bitstream 610 based on video encoder 608. Video decoder 612 may process the second instance of bitstream 610 to generate second instance of video data 614. Loss determiner 620 may determine a second instance of loss 622 based on video data 602 and the second instance of video data 614. For example, loss determiner 620 may determine the second instance of loss 622 based on a distortion loss between video data 602 and the second instance of video data 614. Additionally, loss determiner 620 may determine the second instance of loss 622 based on a bit rate 632 of the second instance of bitstream 610. For example, loss determiner 620 may determine the second instance of loss 622 as $$l_{-=rate2+\lambda} * MSE(\text{input video, reconstructed video 2})$$

where $l_-$ represents the second instance of loss 622,
where rate2 represents bit rate 632 of the second instance of bitstream 610,
where $\lambda$ is a hyperparameter,
where MSE represents a mean-square error function as an example of a distortion-loss determining function,
where input video represents video data 602, and
where reconstructed video 2 represents the first instance of video data 614.

Gradient determiner 628 may determine gradient 630 based on the first and second instances of loss 622. For example, gradient determiner 628 may determine gradient determiner 628 according to:

$$d_t = \text{sign}\left(\frac{l_+ - l_-}{v_t}\right) \text{ and}$$

$$g_t \leftarrow |v_t| d_t$$

where $d_t$ represents a direction of changes to parameters of video preprocessor 404;
where sign represents a sign function,
where $l_+$ represents the first instance of loss 622,
where $l_-$ represents the second instance of loss 622,
where $v_t$ represents variables 626, and
where $g_t$ represents gradient 630, changes to parameters of video preprocessor 404.

After determining gradient 630, parameter adjuster 624 may adjust parameters (e.g., weights) of video preprocessor 404 based on gradient 630. For example, parameter adjuster 624 may reset the parameters of video preprocessor 404 by adding the first set of variables 626. Further, parameter adjuster 624 may update the network parameters by adding gradient 630 for example, according to:

$$\theta_{t+1} = \theta_t - \eta * g_t$$

where $\theta_{t+1}$ represents the parameters after updating,
where $\theta_t$ represents the parameters before updating,
where $\eta$ is a hyperparameter, and
where $g_t$ represents gradient 630.

The process described with regard to FIG. 6 may be repeated any number of times. For example, the process may be repeated until instances of loss 622 and/or gradient 630 are below respective loss threshold and gradient thresholds (e.g., for a threshold number of iterations). In other words, the training process of FIG. 6 may be repeated until video preprocessor 404 converges.

Figure 7:
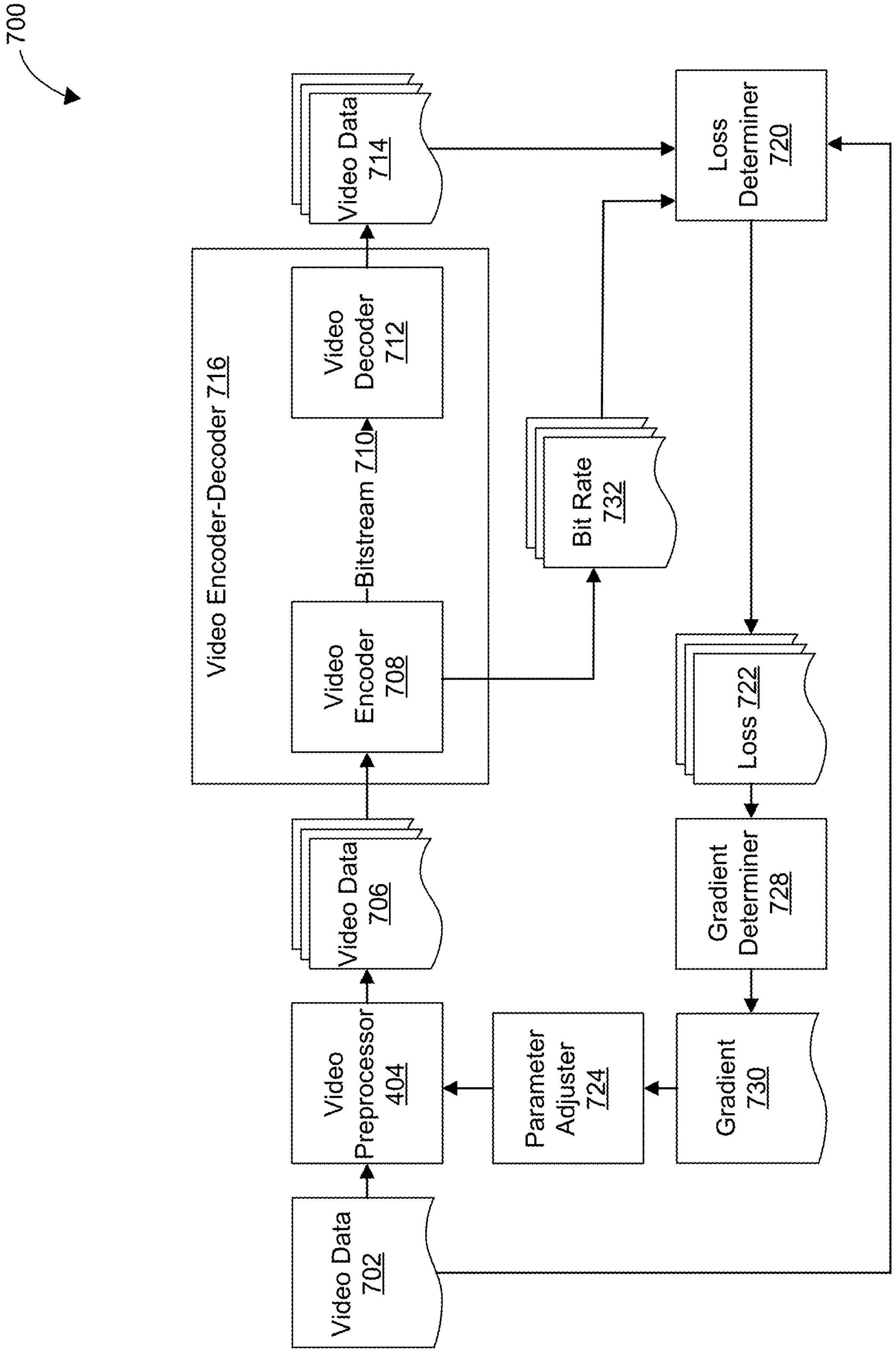
FIG. 7 is a block diagram illustrating an example system for training a video preprocessor, according to various aspects of the present disclosure.

FIG. 7 is a block diagram illustrating an example system 700 for training video preprocessor 404, according to various aspects of the present disclosure. System 700 implements an example of training video preprocessor 404 through an "domain adaptation" phase of training. Video preprocessor 404 may be trained according to one or more additional phases of training in addition to the "domain adaptation" phase of training described with regard to FIG. 7. For example, prior to the "domain adaptation" phase of training described with regard to FIG. 7, video preprocessor 404 may be trained according to the "as a postprocessor" phase of training described with regard to FIG. 5 and/or the "feed-forward optimization" phase of training described with regard to FIG. 6.

The "domain adaptation" phase of training described with regard to FIG. 7 may be substantially similar to the "feed-forward optimization" phase of training described with regard to FIG. 6. For example, a parameter adjuster 724 may adjust parameters (e.g., weights) of video preprocessor 404 by a known amount, then video preprocessor 404, may process video data 702 a first time to generate a first instance of video data 706. A video encoder 708 may process the first instance of video data 706 to generate a first instance of bitstream 710 and a video decoder 712 may process the first instance of bitstream 710 to generate a first instance of video data 714. A loss determiner 720 may determine a first instance of a loss 722 based on video data 702 and the first instance of video data 714.

Continuing the example, parameter adjuster 724 may adjust the parameters of video preprocessor 404 by another known amount (e.g., opposite the first amount), then video preprocessor 404, may process video data 702 a second time to generate a second instance of video data 706. Video encoder 708 may process the second instance of video data 706 to generate a second instance of bitstream 710 and video decoder 712 may process the second instance of bitstream 710 to generate a second instance of video data 714. Loss determiner 720 may determine a second instance of loss 722 based on video data 702 and the second instance of video data 714. After determining the first instance of loss 722 and second instance of loss 722, gradient determiner 728 may determine a gradient 730 based on the first instance of loss 622 and the second instance of loss 622. Parameter adjuster 724 may adjust parameters of video preprocessor 404 based on gradient 730.

The "feed-forward optimization" phase of training described with regard to FIG. 6 may be implemented in a training system (e.g., system 600). In contrast, the "domain adaptation" phase of training described with regard to FIG. 7 may be implemented in a device. For example, video preprocessor 404, video encoder 708, video decoder 712, loss determiner 720, gradient determiner 728, and parameter adjuster 724 may be deployed in a device, such as a user device, such as a camera, a smartphone, etc. In the device, system 700 may implement online domain adaptation.

For example, video data 702 may be video data captured by the device. In some aspects, video data 702 may be, or may include, a number (e.g., 30) of frames of video data captured by the device. System 700 may finetune video preprocessor 404 as described with regard to the "feed-forward optimization" phase of training described with regard to FIG. 6 using video data 702 captured by the device.

System 700 may train video preprocessor 404 until video preprocessor 404 converges. After video preprocessor 404 has converged, system 700 may disable or bypass loss determiner 720, gradient determiner 728, and parameter adjuster 724. For example, after video preprocessor 404 has converged, system 700 may use video preprocessor 404, video encoder 708, and video decoder 712 to process video data 702 (e.g., as described with regard to system 400 of FIG. 4).

In some aspects, system 700 may train video preprocessor 404 based on content of video data 702. For example, loss determiner 720 may periodically determine differences between video data 702 and video data 714 (or between video data 706 and video data 714). If a difference between video data 702 and video data 714 (or between video data 706 and video data 714) exceeds a threshold, system 700 may determine to finetune video preprocessor 404. For example, system 700 may activate loss determiner 720, gradient determiner 728, and parameter adjuster 724 and adjust parameters of video preprocessor 404 according to the "feed-forward optimization" phase of training described with regard to FIG. 6.

Figure 8:
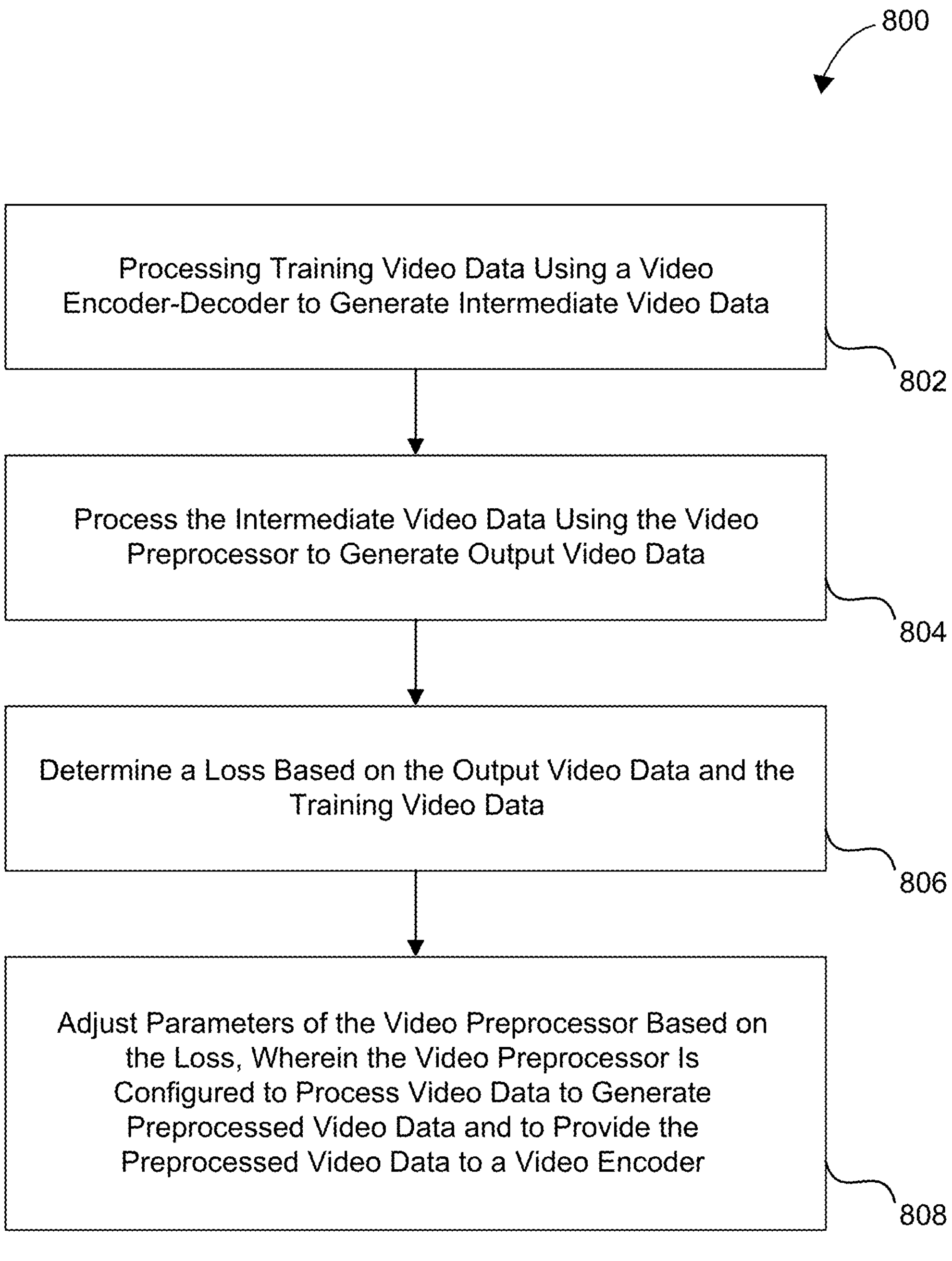
FIG. 8 is a flow diagram illustrating an example process for training a video preprocessor, in accordance with aspects of the present disclosure.

FIG. 8 is a flow diagram illustrating an example process 800 for training a video preprocessor, in accordance with aspects of the present disclosure. One or more operations of process 800 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the one or more operations of process 800. The one or more operations of process 800 may be implemented as software components that are executed and run on one or more processors.

At block 802, a computing device (or one or more components thereof) may process training video data using a video encoder-decoder to generate intermediate video data. For example, video encoder-decoder 516 may process video data 502 to generate video data 514.

At block 804, the computing device (or one or more components thereof) may process the intermediate video data using the video preprocessor to generate output video data. For example, video preprocessor 404 may process video data 514 to generate video data 518.

In some aspects, the computing device (or one or more components thereof) may randomly initialize the parameters of the video preprocessor. For example, the parameters of video preprocessor 404 may be randomly initialized.

At block 806, the computing device (or one or more components thereof) may determine a loss based on the output video data and the training video data. For example, loss determiner 520 may process video data 502 and video data 518 to generate loss 522.

In some aspects, the loss may be, or may include, a distortion loss based on the output video data and the training video data. For example, loss determiner 520 may determine loss 522 as a distortion loss based on video data 502 and video data 518.

At block 808, the computing device (or one or more components thereof) may adjust parameters of the video preprocessor based on the loss, wherein the video preprocessor is configured to process video data to generate preprocessed video data and to provide the preprocessed video data to a video encoder. For example, parameter adjuster 524 may adjust one or more parameters of video preprocessor 404 based on loss 522. Video preprocessor 404 may be trained to be used in a system such as system 400 of FIG. 4 to preprocess video data 402 to generate video data 406 and to provide video data 406 to video encoder 408.

In some aspects, the video encoder-decoder may be, or may include, the video encoder. For example, in the training process 800, video preprocessor 404 may be trained using video encoder-decoder 516 which may include video encoder 508. When video preprocessor 404 is deployed, video preprocessor 404 may be deployed with video encoder 508. For example, when video preprocessor 404 is deployed in system 400, video encoder 508 may be deployed as video encoder 408.

Block 802, block 804, block 806 and block 808 may describe an "as a postprocessor phase of training video preprocessor 404. Additionally, video preprocessor 404 may be trained through a feed-forward-optimization phase of training. In some aspects, the training video data may be first training video data. The intermediate video data may be first intermediate video data. The video encoder-decoder may be a first video encoder-decoder. The output video data may be first output video data. The loss may be a first loss. The computing device (or one or more components thereof) may adjust the parameters of the video preprocessor based on a first variable; process second training video data using the video preprocessor to generate second intermediate video data; process the second intermediate video data using a second video encoder-decoder to generate second output video data; determine a second loss based on the second output video data and the second training video data; adjust the parameters of the video preprocessor based on a second variable; process the second training video data using the video preprocessor to generate third intermediate video data; process the third intermediate video data using the second video encoder-decoder to generate third output video data; determine a third loss based on the third output video data and the second training video data; determine a gradient based on the second loss, the third loss, and the first variable; and adjust the parameters of the video preprocessor based on the gradient. For example, parameter adjuster 624 may adjust parameters of video preprocessor 404 based on first variables (e.g., a set of random variables). With its parameters adjusted according to the first variables, video preprocessor 404 may process video data 602 to generate video data 606. Video encoder-decoder 616 may process video data 606 to generate video data 614. Loss determiner 620 may determine a first instance of loss 622 based on video data 614. Further, parameter adjuster 624 may adjust parameters of video preprocessor 404 based on second variables (which may be related to the first variables). With its parameters adjusted according to the second variables, video preprocessor 404 may process video data 602 to generate video data 606. Video encoder-decoder 616 may process video data 606 to generate video data 614. Loss determiner 620 may determine a second instance of loss 622 based on video data 614. Gradient determiner 628 may determine gradient 630 based on the first instance of loss 622, the second instance of loss 622, and the first variables. Parameter adjuster 624 may adjust parameters of video preprocessor 404 based on gradient 630.

In some aspects, the first variable may be a random variable. For example, the first variables determined by parameter adjuster 624 may be random variables.

In some aspects, the second variable is determined by multiplying the first variable by negative two. For example, to determine the second variables, parameter adjuster 624 may multiply the first variables by negative two.

In some aspects, the second video encoder-decoder may be, or may include, the first video encoder-decoder. For example, video encoder-decoder 516 used at block 804 may be used again as video encoder-decoder 616 when generating video data 614 based on video data 606.

Block 802, block 804, block 806 and block 808 may describe an "as a postprocessor phase of training video preprocessor 404. Additionally, video preprocessor 404 may be trained through a domain adaptation phase of training. In some aspects, the computing device (or one or more components thereof) may process video data using the video preprocessor to generate preprocessed video data; process the preprocessed video data using the video encoder to generate encoded video data; process the encoded video data using a video decoder to generate decoded video data; determine a loss based on the decoded video data and the video data; and adjust the parameters of the video preprocessor based on the loss. For example, video preprocessor 404 may process video data 702 to generate video data 706. 716/may process video data 706 to generate video data 714. Loss determiner 720 may determine loss 722 based on video data 714 and video data 702 parameter adjuster 724 may adjust parameters of video preprocessor 404 based on loss 722.

Figure 9:
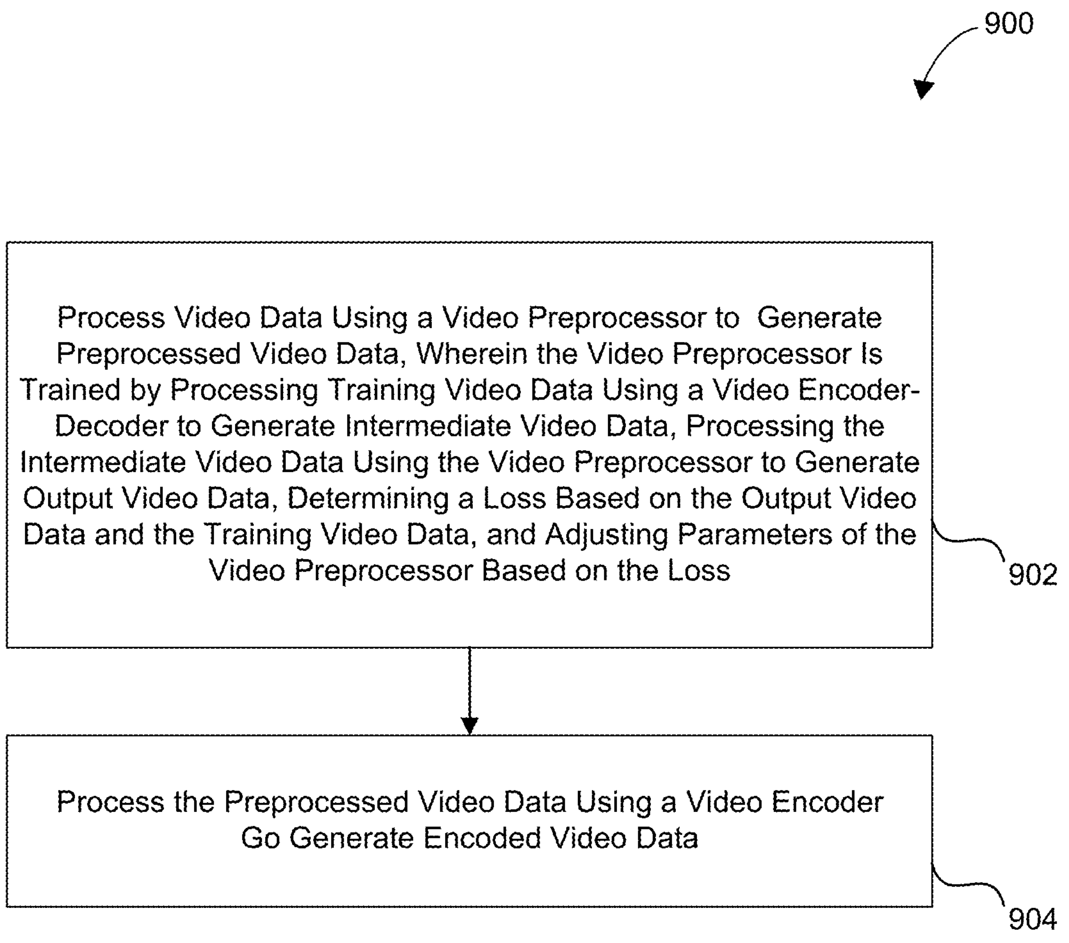
FIG. 9 is a flow diagram illustrating an example process for processing video data, in accordance with aspects of the present disclosure.

FIG. 9 is a flow diagram illustrating an example process 900 for processing video data, in accordance with aspects of the present disclosure. One or more operations of process 900 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the one or more operations of process 900. The one or more operations of process 900 may be implemented as software components that are executed and run on one or more processors.

At a block 902, a computing device (or one or more components thereof) may process video data using a video preprocessor to generate preprocessed video data, wherein the video preprocessor is trained by processing training video data using a video encoder-decoder to generate intermediate video data, processing the intermediate video data using the video preprocessor to generate output video data, determining a loss based on the output video data and the training video data, and adjusting parameters of the video preprocessor based on the loss. For example, system 400 may use video preprocessor 404 to process video data 402 to generate video data 406. Video preprocessor 404 may have been trained as a postprocessor (e.g., as described with regard to FIG. 5 and FIG. 8), through feed-forward optimization (e.g., as describe with regard to FIG. 6), and/or through domain adaptation (e.g., as described with regard to FIG. 7.

At a block 904, the computing device (or one or more components thereof) may process the preprocessed video data using a video encoder to generate encoded video data. For example, video encoder 408 may process video encoder 408 to generate bitstream 410.

In some examples, as noted previously, the methods described herein (e.g., process 800 of FIG. 8, process 900 of FIG. 9, and/or other methods described herein) can be performed, in whole or in part, by a computing device or apparatus. In one example, one or more of the methods can be performed by system 400 of FIG. 4, system 500 of FIG. 5, system 600 of FIG. 6, system 700 of FIG. 7, or by another system or device. In another example, one or more of the methods (e.g., process 800, process 900, and/or other methods described herein) can be performed, in whole or in part, by the computing-device architecture 1200 shown in FIG. 12. For instance, a computing device with the computing-device architecture 1200 shown in FIG. 12 can include, or be included in, the components of the system 400, system 500, system 600, and/or system 700, and can implement the operations of process 800, process 900, and/or other process described herein. In some cases, the computing device or apparatus can include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device can include a display, a network interface configured to communicate and/or receive the data, any combination thereof, and/or other component(s). The network interface can be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 800, process 900, and/or other process described herein are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 800, process 900, and/or other process described herein can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a computer-readable or machine-readable storage medium, for example, in the form of a computer program comprising a plurality of instructions executable by one or more processors. The computer-readable or machine-readable storage medium can be non-transitory.

As noted above, various aspects of the present disclosure can use machine-learning models or systems.

Figure 10:
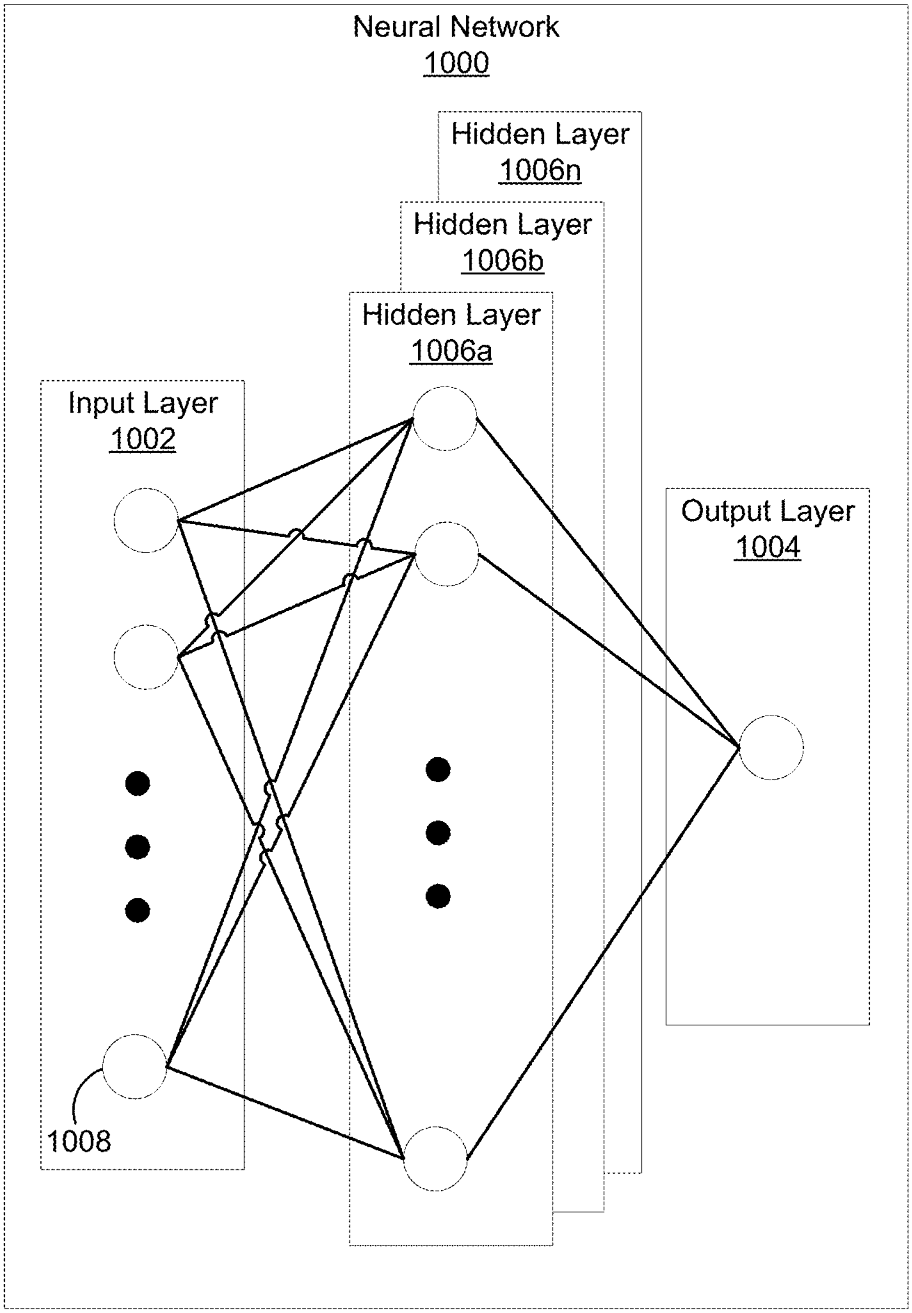
FIG. 10 is a block diagram illustrating an example of a deep learning neural network that can be used to perform various tasks, according to some aspects of the disclosed technology.

FIG. 10 is an illustrative example of a neural network 1000 (e.g., a deep-learning neural network) that can be used to implement machine-learning based feature segmentation, implicit-neural-representation generation, rendering, classification, object detection, image recognition (e.g., face recognition, object recognition, scene recognition, etc.), feature extraction, authentication, gaze detection, gaze prediction, and/or automation. For example, neural network 1000 may be an example of, or can implement, video preprocessor 404 of FIG. 4, FIG. 5, FIG. 6, and FIG. 7.

An input layer 1002 includes input data. In one illustrative example, input layer 1002 can include data representing video data, such as video data 402 of FIG. 4, video data 514 of FIG. 5, video data 602 of FIG. 6, and/or video data 702 of FIG. 7.

Neural network 1000 includes multiple hidden layers, for example, hidden layers 1006*a*, 1006*b*, through 1006*n*. The hidden layers 1006*a*, 1006*b*, through hidden layer 1006*n* include "n" number of hidden layers, where "n" is an integer greater than or equal to one. The number of hidden layers can be made to include as many layers as needed for the given application. Neural network 1000 further includes an output layer 1004 that provides an output resulting from the processing performed by the hidden layers 1006*a*, 1006*b*, through 1006*n*. In one illustrative example, output layer 1004 can generate video data, such as video data 406 of FIG. 4, video data 518 of FIG. 5, video data 606 of FIG. 6 and/or video data 706 of FIG. 7.

Neural network 1000 may be, or may include, a multi-layer neural network of interconnected nodes. Each node can represent a piece of information. Information associated with the nodes is shared among the different layers and each layer retains information as information is processed. In some cases, neural network 1000 can include a feed-forward network, in which case there are no feedback connections where outputs of the network are fed back into itself. In some cases, neural network 1000 can include a recurrent neural network, which can have loops that allow information to be carried across nodes while reading in input.

Information can be exchanged between nodes through node-to-node interconnections between the various layers. Nodes of input layer 1002 can activate a set of nodes in the first hidden layer 1006*a*. For example, as shown, each of the input nodes of input layer 1002 is connected to each of the nodes of the first hidden layer 1006*a*. The nodes of first hidden layer 1006*a* can transform the information of each input node by applying activation functions to the input node information. The information derived from the transformation can then be passed to and can activate the nodes of the next hidden layer 1006*b*, which can perform their own designated functions. Example functions include convolutional, up-sampling, data transformation, and/or any other suitable functions. The output of the hidden layer 1006*b* can then activate nodes of the next hidden layer, and so on. The output of the last hidden layer 1006*n* can activate one or more nodes of the output layer 1004, at which an output is provided. In some cases, while nodes (e.g., node 1008) in neural network 1000 are shown as having multiple output lines, a node has a single output and all lines shown as being output from a node represent the same output value.

In some cases, each node or interconnection between nodes can have a weight that is a set of parameters derived from the training of neural network 1000. Once neural network 1000 is trained, it can be referred to as a trained neural network, which can be used to perform one or more operations. For example, an interconnection between nodes can represent a piece of information learned about the interconnected nodes. The interconnection can have a tunable numeric weight that can be tuned (e.g., based on a training dataset), allowing neural network 1000 to be adaptive to inputs and able to learn as more and more data is processed.

Neural network 1000 may be pre-trained to process the features from the data in the input layer 1002 using the different hidden layers 1006*a*, 1006*b*, through 1006*n* in order to provide the output through the output layer 1004. In an example in which neural network 1000 is used to identify features in images, neural network 1000 can be trained using training data that includes both images and labels, as described above. For instance, training images can be input into the network, with each training image having a label indicating the features in the images (for the feature-segmentation machine-learning system) or a label indicating classes of an activity in each image. In one example using object classification for illustrative purposes, a training image can include an image of a number 2, in which case the label for the image can be [0 0 1 0 0 0 0 0 0 0].

In some cases, neural network 1000 can adjust the weights of the nodes using a training process called backpropagation. As noted above, a backpropagation process can include a forward pass, a loss function, a backward pass, and a weight update. The forward pass, loss function, backward pass, and parameter update are performed for one training iteration. The process can be repeated for a certain number of iterations for each set of training images until neural network 1000 is trained well enough so that the weights of the layers are accurately tuned.

For the example of identifying objects in images, the forward pass can include passing a training image through neural network 1000. The weights are initially randomized before neural network 1000 is trained. As an illustrative example, an image can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for neural network 1000, the output will likely include values that do not give preference to any particular class due to the weights being randomly selected at initialization. For example, if the output is a vector with probabilities that the object includes different classes, the probability value for each of the different classes can be equal or at least very similar (e.g., for ten possible classes, each class can have a probability value of 0.1). With the initial weights, neural network 1000 is unable to determine low-level features and thus cannot make an accurate determination of what the classification of the object might be. A loss function can be used to analyze error in the output. Any suitable loss function definition can be used, such as a cross-entropy loss. Another example of a loss function includes the mean squared error (MSE), defined as $E_{total}=\Sigma \frac{1}{2}(\text{target}-\text{output})^2$. The loss can be set to be equal to the value of $E_{total}$.

The loss (or error) will be high for the first training images since the actual values will be much different than the predicted output. The goal of training is to minimize the amount of loss so that the predicted output is the same as the training label. Neural network 1000 can perform a backward pass by determining which inputs (weights) most contributed to the loss of the network and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $w=w_i-\eta\ dL/dW$, where w denotes a weight, $w_i$ denotes the initial weight, and n denotes a learning rate. The learning rate can be set to any suitable value, with a high learning rate including larger weight updates and a lower value indicating smaller weight updates.

Neural network 1000 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. Neural network 1000 can include any other deep network other than a CNN, such as an autoencoder, a deep belief nets (DBNs), a Recurrent Neural Networks (RNNs), among others.

Figure 11:
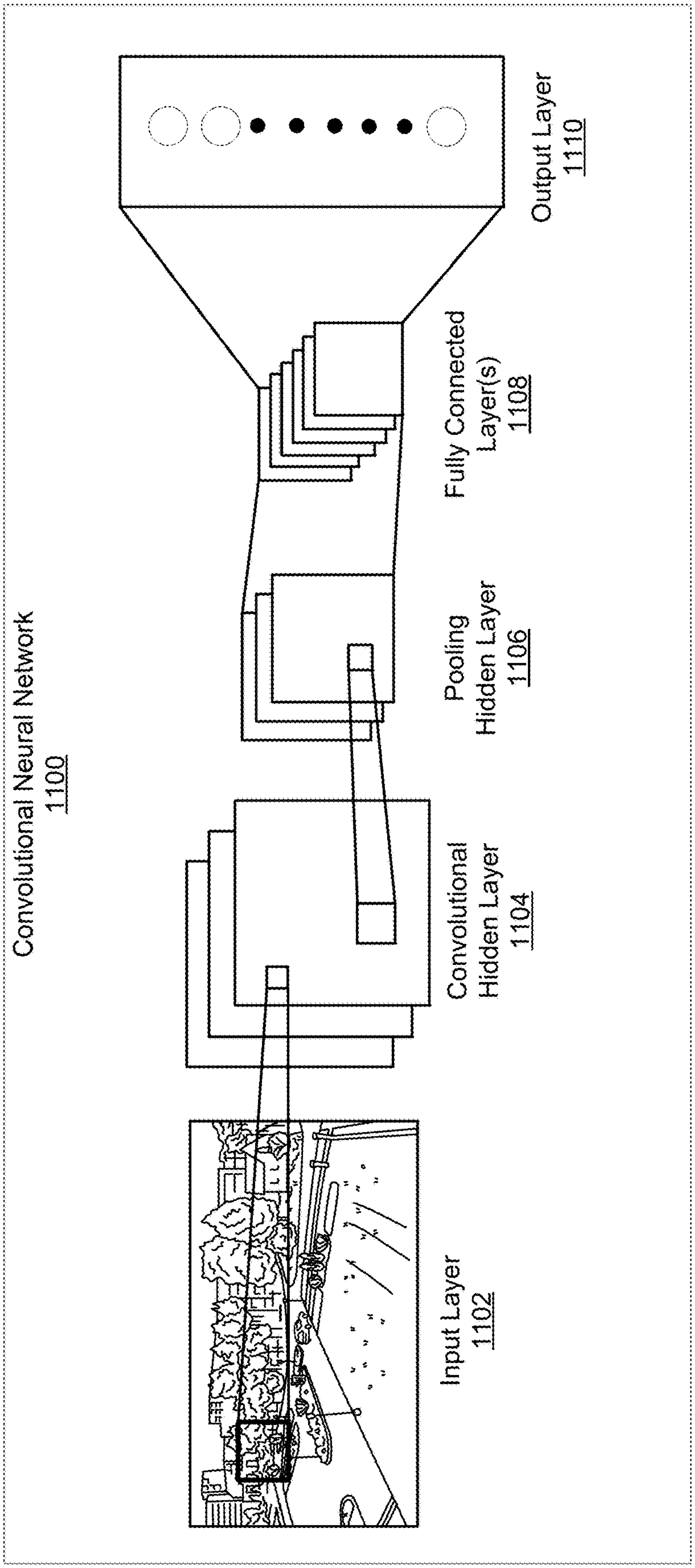
FIG. 11 is a block diagram illustrating an example of a convolutional neural network (CNN), according to various aspects of the present disclosure.

FIG. 11 is an illustrative example of a convolutional neural network (CNN) 1100. The input layer 1102 of the CNN 1100 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1104, an optional non-linear activation layer, a pooling hidden layer 1106, and fully connected layer 1108 (which fully connected layer 1108 can be hidden) to get an output at the output layer 1110. While only one of each hidden layer is shown in FIG. 11, one of ordinary skill will appreciate that multiple convolutional hidden layers, non-linear layers, pooling hidden layers, and/or fully connected layers can be included in the CNN 1100. As previously described, the output can indicate a single class of an object or can include a probability of classes that best describe the object in the image.

The first layer of the CNN 1100 can be the convolutional hidden layer 1104. The convolutional hidden layer 1104 can analyze image data of the input layer 1102. Each node of the convolutional hidden layer 1104 is connected to a region of nodes (pixels) of the input image called a receptive field. The convolutional hidden layer 1104 can be considered as one or more filters (each filter corresponding to a different activation or feature map), with each convolutional iteration of a filter being a node or neuron of the convolutional hidden layer 1104. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1104. Each connection between a node and a receptive field for that node learns a weight and, in some cases, an overall bias such that each node learns to analyze its particular local receptive field in the input image. Each node of the convolutional hidden layer 1104 will have the same weights and bias (called a shared weight and a shared bias). For example, the filter has an array of weights (numbers) and the same depth as the input. A filter will have a depth of 3 for an image frame example (according to three color components of the input image). An illustrative example size of the filter array is 5×5×3, corresponding to a size of the receptive field of a node.

The convolutional nature of the convolutional hidden layer 1104 is due to each node of the convolutional layer being applied to its corresponding receptive field. For example, a filter of the convolutional hidden layer 1104 can begin in the top-left corner of the input image array and can convolve around the input image. As noted above, each convolutional iteration of the filter can be considered a node or neuron of the convolutional hidden layer 1104. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1104. For example, a filter can be moved by a step amount (referred to as a stride) to the next receptive field. The stride can be set to 1 or any other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1104.

The mapping from the input layer to the convolutional hidden layer 1104 is referred to as an activation map (or feature map). The activation map includes a value for each node representing the filter results at each location of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 1104 can include several activation maps in order to identify multiple features in an image. The example shown in FIG. 11 includes three activation maps. Using three activation maps, the convolutional hidden layer 1104 can detect three different kinds of features, with each feature being detectable across the entire image.

In some examples, a non-linear hidden layer can be applied after the convolutional hidden layer 1104. The non-linear layer can be used to introduce non-linearity to a system that has been computing linear operations. One illustrative example of a non-linear layer is a rectified linear unit (ReLU) layer. A ReLU layer can apply the function $f(x)=\text{mas}(0, x)$ to all of the values in the input volume, which changes all the negative activations to 0. The ReLU can thus increase the non-linear properties of the CNN 1100 without affecting the receptive fields of the convolutional hidden layer 1104.

The pooling hidden layer 1106 can be applied after the convolutional hidden layer 1104 (and after the non-linear hidden layer when used). The pooling hidden layer 1106 is used to simplify the information in the output from the convolutional hidden layer 1104. For example, the pooling hidden layer 1106 can take each activation map output from the convolutional hidden layer 1104 and generates a condensed activation map (or feature map) using a pooling function. Max-pooling is one example of a function performed by a pooling hidden layer. Other forms of pooling functions be used by the pooling hidden layer 1106, such as average pooling, L2-norm pooling, or other suitable pooling functions. A pooling function (e.g., a max-pooling filter, an L2-norm filter, or other suitable pooling filter) is applied to each activation map included in the convolutional hidden layer 1104. In the example shown in FIG. 11, three pooling filters are used for the three activation maps in the convolutional hidden layer 1104.

In some examples, max-pooling can be used by applying a max-pooling filter (e.g., having a size of 2×2) with a stride (e.g., equal to a dimension of the filter, such as a stride of 2) to an activation map output from the convolutional hidden layer 1104. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1104 having a dimension of 24×24 nodes, the output from the pooling hidden layer 1106 will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling) and using the computed values as an output.

The pooling function (e.g., max-pooling, L2-norm pooling, or other pooling function) determines whether a given feature is found anywhere in a region of the image and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1100.

The final layer of connections in the network is a fully-connected layer that connects every node from the pooling hidden layer 1106 to every one of the output nodes in the output layer 1110. Using the example above, the input layer includes 28×28 nodes encoding the pixel intensities of the input image, the convolutional hidden layer 1104 includes 3×24×24 hidden feature nodes based on application of a 5×5 local receptive field (for the filters) to three activation maps, and the pooling hidden layer 1106 includes a layer of 3×12×12 hidden feature nodes based on application of max-pooling filter to 2×2 regions across each of the three feature maps. Extending this example, the output layer 1110 can include ten output nodes. In such an example, every node of the 3×12×12 pooling hidden layer 1106 is connected to every node of the output layer 1110.

The fully connected layer 1108 can obtain the output of the previous pooling hidden layer 1106 (which should represent the activation maps of high-level features) and determines the features that most correlate to a particular class. For example, the fully connected layer 1108 can determine the high-level features that most strongly correlate to a particular class and can include weights (nodes) for the high-level features. A product can be computed between the weights of the fully connected layer 1108 and the pooling hidden layer 1106 to obtain probabilities for the different classes. For example, if the CNN 1100 is being used to predict that an object in an image is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1110 can include an M-dimensional vector (in the prior example, M=10). M indicates the number of classes that the CNN 1100 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 12:
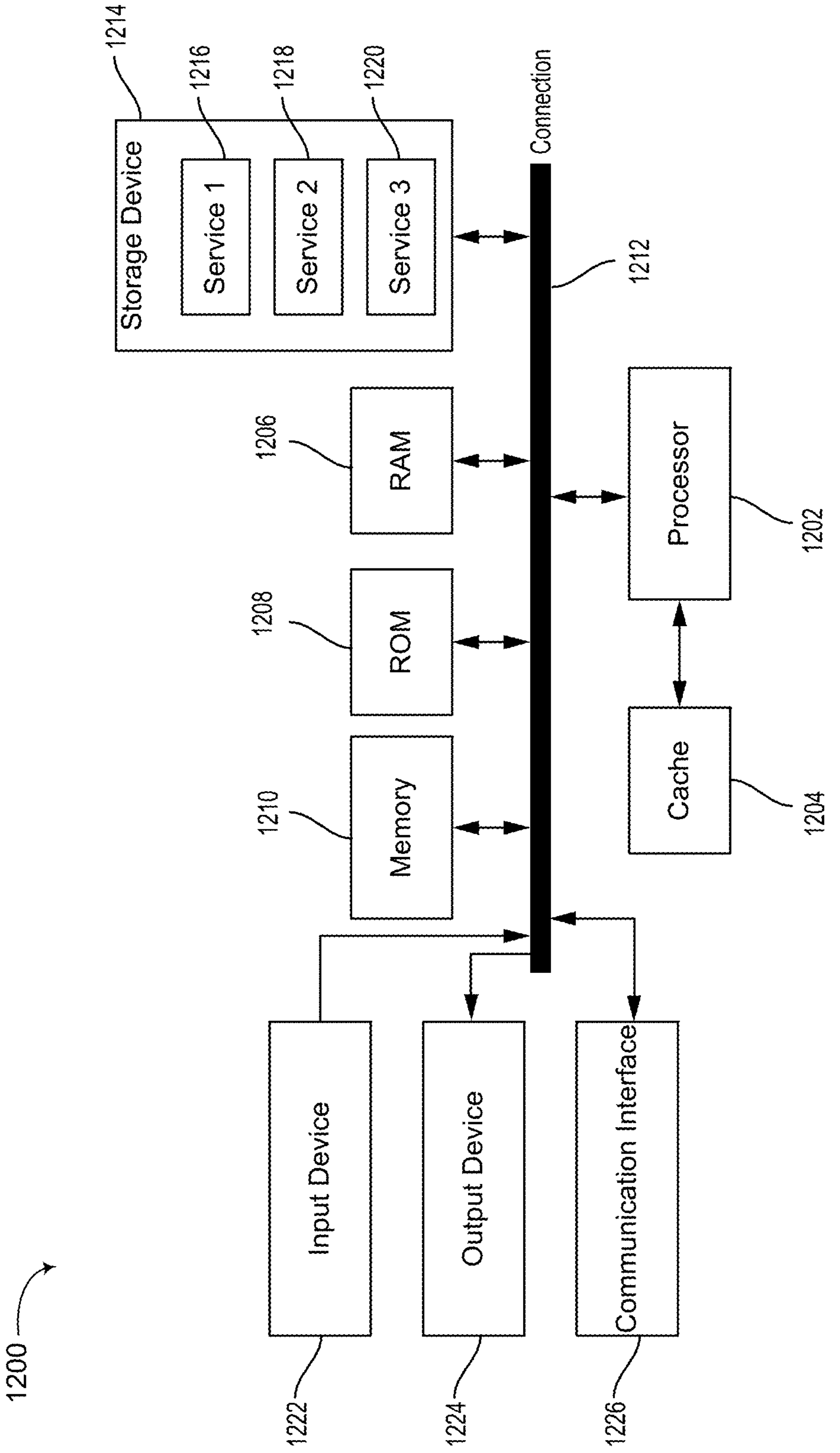
FIG. 12 is a block diagram illustrating an example computing-device architecture of an example computing device which can implement the various techniques described herein.

FIG. 12 illustrates an example computing-device architecture 1200 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing-device architecture 1200 may include, implement, or be included in any or all of system 400 of FIG. 4, system 500 of FIG. 5, system 600 of FIG. 6, system 700 of FIG. 7, and/or other devices, modules, or systems described herein. Additionally or alternatively, computing-device architecture 1200 may be configured to perform process 800, process 900, and/or other process described herein.

The components of computing-device architecture 1200 are shown in electrical communication with each other using connection 1212, such as a bus. The example computing-device architecture 1200 includes a processing unit (CPU or processor) 1202 and computing device connection 1212 that couples various computing device components including computing device memory 1210, such as read only memory (ROM) 1208 and random-access memory (RAM) 1206, to processor 1202.

Computing-device architecture 1200 can include a cache of high-speed memory connected directly with, in close proximity to, or integrated as part of processor 1202. Computing-device architecture 1200 can copy data from memory

1210 and/or the storage device 1214 to cache 1204 for quick access by processor 1202. In this way, the cache can provide a performance boost that avoids processor 1202 delays while waiting for data. These and other modules can control or be configured to control processor 1202 to perform various actions. Other computing device memory 1210 may be available for use as well. Memory 1210 can include multiple different types of memory with different performance characteristics. Processor 1202 can include any general-purpose processor and a hardware or software service, such as service 1 1216, service 2 1218, and service 3 1220 stored in storage device 1214, configured to control processor 1202 as well as a special-purpose processor where software instructions are incorporated into the processor design. Processor 1202 may be a self-contained system, containing multiple cores or processors, a bus, memory controller, cache, etc. A multi-core processor may be symmetric or asymmetric.

To enable user interaction with the computing-device architecture 1200, input device 1222 can represent any number of input mechanisms, such as a microphone for speech, a touch-sensitive screen for gesture or graphical input, keyboard, mouse, motion input, speech and so forth. Output device 1224 can also be one or more of a number of output mechanisms known to those of skill in the art, such as a display, projector, television, speaker device, etc. In some instances, multimodal computing devices can enable a user to provide multiple types of input to communicate with computing-device architecture 1200. Communication interface 1226 can generally govern and manage the user input and computing device output. There is no restriction on operating on any particular hardware arrangement and therefore the basic features here may easily be substituted for improved hardware or firmware arrangements as they are developed.

Storage device 1214 is a non-volatile memory and can be a hard disk or other types of computer readable media which can store data that are accessible by a computer, such as magnetic cassettes, flash memory cards, solid state memory devices, digital versatile discs (DVDs), cartridges, random-access memories (RAMs) 1206, read only memory (ROM) 1208, and hybrids thereof. Storage device 1214 can include services 1216, 1218, and 1220 for controlling processor 1202. Other hardware or software modules are contemplated. Storage device 1214 can be connected to the computing device connection 1212. In one aspect, a hardware module that performs a particular function can include the software component stored in a computer-readable medium in connection with the necessary hardware components, such as processor 1202, connection 1212, output device 1224, and so forth, to carry out the function.

The term "substantially," in reference to a given parameter, property, or condition, may refer to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, magnetic or optical disks, USB devices provided with non-volatile memory, networked storage devices, any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general-purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general-purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, such as, a combination of a DSP and a microprocessor, a plurality of microprocessors, one or more microprocessors in conjunction with a DSP core, or any other such configuration. Accordingly, the term “processor,” as used herein may refer to any of the foregoing structure, any combination of the foregoing structure, or any other structure or apparatus suitable for implementation of the techniques described herein.

Illustrative aspects of the disclosure include:

Aspect 1. An apparatus for training a video preprocessor, the apparatus comprising: at least one memory; and at least one processor coupled to the at least one memory and configured to: process training video data using a video encoder-decoder to generate intermediate video data; process the intermediate video data using the video preprocessor to generate output video data; determine a loss based on the output video data and the training video data; and adjust parameters of the video preprocessor based on the loss, wherein the video preprocessor is configured to process video data to generate preprocessed video data and to provide the preprocessed video data to a video encoder.

Aspect 2. The apparatus of aspect 1, wherein the at least one processor is configured to randomly initialize the parameters of the video preprocessor.

Aspect 3. The apparatus of any one of aspects 1 or 2, wherein the loss comprises a distortion loss based on the output video data and the training video data.

Aspect 4. The apparatus of any one of aspects 1 to 3, wherein the video encoder-decoder comprises the video encoder.

Aspect 5. The apparatus of any one of aspects 1 to 4, wherein the training video data comprises first training video data, the intermediate video data comprises first intermediate video data, the video encoder-decoder comprises a first video encoder-decoder, the output video data comprises first output video data, and the loss comprises a first loss, wherein the at least one processor is configured to: adjust the parameters of the video preprocessor based on a first variable; process second training video data using the video preprocessor to generate second intermediate video data; process the second intermediate video data using a second video encoder-decoder to generate second output video data; determine a second loss based on the second output video data and the second training video data; adjust the parameters of the video preprocessor based on a second variable; process the second training video data using the video preprocessor to generate third intermediate video data; process the third intermediate video data using the second video encoder-decoder to generate third output video data; determine a third loss based on the third output video data and the second training video data; determine a gradient based on the second loss, the third loss, and the first variable; and adjust the parameters of the video preprocessor based on the gradient.

Aspect 6. The apparatus of aspect 5, wherein the second video encoder-decoder comprises the first video encoder-decoder.

Aspect 7. The apparatus of any one of aspects 5 or 6, wherein the second variable is determined by multiplying the first variable by negative two.

Aspect 8. The apparatus of any one of aspects 5 to 7, wherein the first variable comprises a random variable.

Aspect 9. The apparatus of any one of aspects 1 to 8, wherein the at least one processor is configured to: process video data using the video preprocessor to generate preprocessed video data; process the preprocessed video data using the video encoder to generate encoded video data; process the encoded video data using a video decoder to generate decoded video data; determine a loss based on the decoded video data and the video data; and adjust the parameters of the video preprocessor based on the loss.

Aspect 10. An apparatus for processing video data, the apparatus comprising: at least one memory; and at least one processor coupled to the at least one memory and configured to: process video data using a video preprocessor to generate preprocessed video data, wherein the video preprocessor is trained by processing training video data using a video encoder-decoder to generate intermediate video data, processing the intermediate video data using the video preprocessor to generate output video data, determining a loss based on the output video data and the training video data, and adjusting parameters of the video preprocessor based on the loss; and process the preprocessed video data using a video encoder to generate encoded video data.

Aspect 11. A method for training a video preprocessor, the method comprising: processing training video data using a video encoder-decoder to generate intermediate video data; processing the intermediate video data using the video preprocessor to generate output video data; determining a loss based on the output video data and the training video data; and adjusting parameters of the video preprocessor based on the loss, wherein the video preprocessor is configured to process video data to generate preprocessed video data and to provide the preprocessed video data to a video encoder.

Aspect 12. The method of aspect 11, further comprising randomly initializing the parameters of the video preprocessor.

Aspect 13. The method of any one of aspects 11 or 12, wherein the loss comprises a distortion loss based on the output video data and the training video data.

Aspect 14. The method of any one of aspects 11 to 13, wherein the video encoder-decoder comprises the video encoder.

Aspect 15. The method of any one of aspects 11 to 14, wherein the training video data comprises first training video data, the intermediate video data comprises first intermediate video data, the video encoder-decoder comprises a first video encoder-decoder, the output video data comprises first output video data, and the loss comprises a first loss, the method further comprising: adjusting the parameters of the video preprocessor based on a first variable; processing second training video data using the video preprocessor to generate second intermediate video data; processing the second intermediate video data using a second video encoder-decoder to generate second output video data; determining a second loss based on the second output video data and the second training video data; adjusting the parameters of the video preprocessor based on a second variable; processing the second training video data using the video preprocessor to generate third intermediate video data; processing the third intermediate video data using the second video encoder-decoder to generate third output video data; determining a third loss based on the third output video data and the second training video data; determining a gradient based on the second loss, the third loss, and the first variable; and adjusting the parameters of the video preprocessor based on the gradient.

Aspect 16. The method of aspect 15, wherein the second video encoder-decoder comprises the first video encoder-decoder.

Aspect 17. The method of any one of aspects 15 or 16, wherein the second variable is determined by multiplying the first variable by negative two.

Aspect 18. The method of any one of aspects 15 to 17, wherein the first variable comprises a random variable.

Aspect 19. The method of any one of aspects 11 to 18, further comprising: processing video data using the video preprocessor to generate preprocessed video data; processing the preprocessed video data using the video encoder to generate encoded video data; processing the encoded video data using a video decoder to generate decoded video data; determining a loss based on the decoded video data and the video data; and adjusting the parameters of the video preprocessor based on the loss.

Aspect 20. The method of aspect 19, further comprising deploying the video preprocessor on a device, wherein the device comprises the video encoder.

Aspect 21. A method for processing video data, the method comprising: processing video data using a video preprocessor to generate preprocessed video data, wherein the video preprocessor is trained by processing training video data using a video encoder-decoder to generate intermediate video data, processing the intermediate video data using the video preprocessor to generate output video data, determining a loss based on the output video data and the training video data, and adjusting parameters of the video preprocessor based on the loss; and processing the preprocessed video data using a video encoder to generate encoded video data.

Aspect 22. A non-transitory computer-readable storage medium having stored thereon instructions that, when executed by at least one processor, cause the at least one processor to perform operations according to any of aspects 11 to 21.

Aspect 23. An apparatus for providing virtual content for display, the apparatus comprising one or more means for perform operations according to any of aspects 11 to 21.

What is claimed is:

1. An apparatus for training a video preprocessor, the apparatus comprising:
- at least one memory; and
- at least one processor coupled to the at least one memory and configured to:
  - process training video data using a video encoder-decoder to generate intermediate video data;
  - process the intermediate video data using the video preprocessor to generate output video data;
  - determine a loss based on the output video data and the training video data; and
  - adjust parameters of the video preprocessor based on the loss, wherein the video preprocessor is configured to process video data to generate preprocessed video data and to provide the preprocessed video data to a video encoder.

2. The apparatus of claim 1, wherein the at least one processor is configured to randomly initialize the parameters of the video preprocessor.

3. The apparatus of claim 1, wherein the loss comprises a distortion loss based on the output video data and the training video data.

4. The apparatus of claim 1, wherein the video encoder-decoder comprises the video encoder.

5. The apparatus of claim 1, wherein the training video data comprises first training video data, the intermediate video data comprises first intermediate video data, the video encoder-decoder comprises a first video encoder-decoder, the output video data comprises first output video data, and the loss comprises a first loss, wherein the at least one processor is configured to:

adjust the parameters of the video preprocessor based on a first variable;

process second training video data using the video preprocessor to generate second intermediate video data;

process the second intermediate video data using a second video encoder-decoder to generate second output video data;

determine a second loss based on the second output video data and the second training video data;

adjust the parameters of the video preprocessor based on a second variable;

process the second training video data using the video preprocessor to generate third intermediate video data;

process the third intermediate video data using the second video encoder-decoder to generate third output video data;

determine a third loss based on the third output video data and the second training video data;

determine a gradient based on the second loss, the third loss, and the first variable; and adjust the parameters of the video preprocessor based on the gradient.

6. The apparatus of claim 5, wherein the second video encoder-decoder comprises the first video encoder-decoder.

7. The apparatus of claim 5, wherein the second variable is determined by multiplying the first variable by negative two.

8. The apparatus of claim 5, wherein the first variable comprises a random variable.

9. The apparatus of claim 1, wherein the at least one processor is configured to:

process video data using the video preprocessor to generate preprocessed video data;

process the preprocessed video data using the video encoder to generate encoded video data;

process the encoded video data using a video decoder to generate decoded video data;

determine a loss based on the decoded video data and the video data; and adjust the parameters of the video preprocessor based on the loss.

10. An apparatus for processing video data, the apparatus comprising:

at least one memory; and at least one processor coupled to the at least one memory and configured to:

process video data using a video preprocessor to generate preprocessed video data, wherein the video preprocessor is trained by processing training video data using a video encoder-decoder to generate intermediate video data, processing the intermediate video data using the video preprocessor to generate output video data, determining a loss based on the output video data and the training video data, and adjusting parameters of the video preprocessor based on the loss; and process the preprocessed video data using a video encoder to generate encoded video data.

11. A method for training a video preprocessor, the method comprising:

processing training video data using a video encoder-decoder to generate intermediate video data;

processing the intermediate video data using the video preprocessor to generate output video data;

determining a loss based on the output video data and the training video data; and adjusting parameters of the video preprocessor based on the loss, wherein the video preprocessor is configured to process video data to generate preprocessed video data and to provide the preprocessed video data to a video encoder.

12. The method of claim 11, further comprising randomly initializing the parameters of the video preprocessor.

13. The method of claim 11, wherein the loss comprises a distortion loss based on the output video data and the training video data.

14. The method of claim 11, wherein the video encoder-decoder comprises the video encoder.

15. The method of claim 11, wherein the training video data comprises first training video data, the intermediate video data comprises first intermediate video data, the video encoder-decoder comprises a first video encoder-decoder, the output video data comprises first output video data, and the loss comprises a first loss, the method further comprising:

adjusting the parameters of the video preprocessor based on a first variable;

processing second training video data using the video preprocessor to generate second intermediate video data;

processing the second intermediate video data using a second video encoder-decoder to generate second output video data;

determining a second loss based on the second output video data and the second training video data;

adjusting the parameters of the video preprocessor based on a second variable;

processing the second training video data using the video preprocessor to generate third intermediate video data;

processing the third intermediate video data using the second video encoder-decoder to generate third output video data;

determining a third loss based on the third output video data and the second training video data;

determining a gradient based on the second loss, the third loss, and the first variable; and adjusting the parameters of the video preprocessor based on the gradient.

16. The method of claim 15, wherein the second video encoder-decoder comprises the first video encoder-decoder.

17. The method of claim 15, wherein the second variable is determined by multiplying the first variable by negative two.

18. The method of claim 15, wherein the first variable comprises a random variable.

19. The method of claim 11, further comprising:

processing video data using the video preprocessor to generate preprocessed video data;

processing the preprocessed video data using the video encoder to generate encoded video data;

processing the encoded video data using a video decoder to generate decoded video data;

determining a loss based on the decoded video data and the video data; and adjusting the parameters of the video preprocessor based on the loss.

20. The method of claim 19, further comprising deploying the video preprocessor on a device, wherein the device comprises the video encoder.

* * * * *